US012625264B2

(12) United States Patent
Terada

(10) Patent No.: US 12,625,264 B2
(45) Date of Patent: May 12, 2026

(54) DISTANCE MEASURING DEVICE AND DISTANCE MEASURING METHOD

(71) Applicant: SONY SEMICONDUCTOR SOLUTIONS CORPORATION, Kanagawa (JP)

(72) Inventor: Haruhiko Terada, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 312 days.

(21) Appl. No.: 18/255,192

(22) PCT Filed: Nov. 24, 2021

(86) PCT No.: PCT/JP2021/042881
§ 371 (c)(1),
(2) Date: May 31, 2023

(87) PCT Pub. No.: WO2022/124066
PCT Pub. Date: Jun. 16, 2022

(65) Prior Publication Data
US 2024/0004072 A1     Jan. 4, 2024

(30) Foreign Application Priority Data
Dec. 8, 2020     (JP) ................................. 2020-203412

(51) Int. Cl.
G01S 17/34 (2020.01)
G01S 7/4911 (2020.01)
(Continued)

(52) U.S. Cl.
CPC ............. G01S 17/34 (2020.01); G01S 7/4911 (2013.01); G01S 7/4913 (2013.01); G01S 7/4917 (2013.01); G01S 17/58 (2013.01)

(58) Field of Classification Search
CPC ...... G01S 17/34; G01S 7/4911; G01S 7/4913; G01S 7/4917; G01S 17/58; G01S 7/4817; G01S 7/4815; G01C 3/06
See application file for complete search history.

(56) References Cited

U.S. PATENT DOCUMENTS 7,269,359 B1 * 9/2007 McAdoo ................. H10F 30/24
257/E31.066
2016/0109565 A1     4/2016 Hyun et al.
(Continued)

FOREIGN PATENT DOCUMENTS

JP           2005037354 A  *  2/2005
WO        2007/020704 A1     2/2007
(Continued)

OTHER PUBLICATIONS

International Search Report and Written Opinion of PCT Application No. PCT/JP2021/042881, issued on Feb. 8, 2022, 12 pages of ISRWO.
(Continued)

*Primary Examiner* — Michelle M Iacoletti
*Assistant Examiner* — Maher Yazback
(74) *Attorney, Agent, or Firm* — CHIP LAW GROUP

(57) ABSTRACT

Provided is a distance measuring device and a distance measuring method capable of achieving LiDAR with high accuracy at low cost. In a plurality of division times obtained by dividing a modulation cycle for chirp-modulating frequencies of transmission beams of a plurality of channels, light emission and extinction of a plurality of light sources are controlled in a unique pattern for each light source, an interference beam between a reception beam and a transmission beam is detected, digitized into a reception signal sequence, and subjected to FFT to obtain a frequency spectrum, a beat frequency is specified from comparison of magnitude of peaks, and a distance to a measurement target
(Continued)

and a relative speed are measured. The present disclosure can be applied to LiDAR.

18 Claims, 15 Drawing Sheets

(51) Int. Cl.

| | | |
|---|---|---|
| *G01S 7/4912* | (2020.01) | |
| *G01S 7/4913* | (2020.01) | |
| *G01S 17/58* | (2006.01) | |

(56) References Cited

U.S. PATENT DOCUMENTS

| | | | | |
|---|---|---|---|---|
| 2016/0213258 | A1* | 7/2016 | Lashkari | G01S 15/8915 |
| 2017/0184450 | A1* | 6/2017 | Doylend | G01S 7/4817 |
| 2017/0234977 | A1* | 8/2017 | Kim | G01S 17/10 |
| | | | | 356/5.01 |
| 2017/0242108 | A1* | 8/2017 | Dussan | G01S 7/4868 |
| 2018/0283950 | A1* | 10/2018 | Ge | G01J 9/04 |
| 2019/0334534 | A1* | 10/2019 | Kitamura | H04B 1/30 |
| 2020/0142065 | A1 | 5/2020 | Boloorian et al. | |
| 2020/0241139 | A1* | 7/2020 | Roos | G01S 17/931 |
| 2021/0026015 | A1* | 1/2021 | Davydenko | G01S 7/4817 |
| 2021/0208258 | A1* | 7/2021 | Kim | G01S 17/10 |
| 2022/0040187 | A1* | 2/2022 | Montgomery | A61K 31/437 |
| 2023/0400354 | A1* | 12/2023 | Grote | G01S 17/89 |

FOREIGN PATENT DOCUMENTS

| | | | | | |
|---|---|---|---|---|---|
| WO | 2017/126386 | A1 | 7/2017 | | |
| WO | 2017/141352 | A1 | 8/2017 | | |
| WO | WO-2017143217 | A1* | 8/2017 | | G01S 7/4813 |
| WO | 2018/003852 | A1 | 1/2018 | | |
| WO | 2019/141641 | A1 | 7/2019 | | |
| WO | WO-2021150826 | A1* | 7/2021 | | G01S 17/58 |

OTHER PUBLICATIONS

Toshio Iguchi, "HF Ocean Radar 3. On the Transmit/Receive Switching Wave form for FMICW HF Ocean Radar", Review of the Communications Research Laboratory, vol. 37, No. 3, May 31, 1991, pp. 361-374.

* cited by examiner

DISTANCE MEASURING DEVICE AND DISTANCE MEASURING METHOD

CROSS REFERENCE TO RELATED APPLICATIONS

This application is a U.S. National Phase of International Patent Application No. PCT/JP2021/042881 filed on Nov. 24, 2021, which claims priority benefit of Japanese Patent Application No. JP 2020-203412 filed in the Japan Patent Office on Dec. 8, 2020. Each of the above-referenced applications is hereby incorporated herein by reference in its entirety.

TECHNICAL FIELD

The present disclosure relates to a distance measuring device, a distance measuring method, and a program, and more particularly relates to a distance measuring device, a distance measuring method, and a program capable of achieving highly accurate distance measurement at low cost.

BACKGROUND ART

Distance measuring devices called light detection and ranging, laser imaging detection and ranging (LiDAR) have been widely used.

LiDAR is a distance measuring device that implements distance measurement to an object by irradiating the object with a laser beam as a distance measuring beam, and measuring a round-trip time obtained from an irradiation timing and a beam reception timing of a reflected beam.

As a technique for improving resistance to external light in distance measurement performance of LiDAR, a technology has been proposed in which chirp modulation is applied to a laser beam of multiple channels including a plurality of wavelengths having different wavelengths and the laser beam is projected as a transmission beam, a reflected beam from an object is received, and distance measurement is implemented on the basis of a beat frequency that is a difference frequency between the transmission beam and a reference beam having a frequency slightly different from that of the transmission beam (see Patent Document 1).

CITATION LIST

Patent Document

Patent Document 1: US 2020/0142065 A

SUMMARY OF THE INVENTION

Problems to be Solved by the Invention

However, in the technique described in Patent Document 1, since the multi-channel transmission beam and the reference beam are configured as individual light sources, the cost of the light sources increases.

Furthermore, since the frequency difference between the distance measuring beam and the reference beam having a slightly different frequency affects distance measurement accuracy, the configuration for controlling the frequency difference with high accuracy becomes complicated, and the cost increases.

Moreover, the configuration of a light receiving unit has a high cutoff frequency, and high cost is necessary to achieve high accuracy.

The present disclosure has been made in view of such circumstances, and particularly to achieve highly accurate ranging at low cost.

Solutions to Problems

A distance measuring device and a program according to one aspect of the present disclosure are a distance measuring device including a light source of a plurality of transmission beams, a light emission control unit that individually controls light emission and extinction of the light source of the plurality of transmission beams, an optical deflection unit that deflects the transmission beams at angles depending on the frequencies, and a detection unit that detects an interference beam generated by interference with a reception beam received by reflection of the transmission beams by a measurement target, and a program.

A distance measuring method according to one aspect of the present disclosure is a distance measuring method of a distance measuring device including a light source of a plurality of transmission beams, a light emission control unit that individually controls light emission and extinction of the light source of the plurality of transmission beams, an optical deflection unit that deflects the transmission beams at angles depending on the frequencies, and a detection unit that detects an interference beam generated by interference with a reception beam received by reflection of the transmission beams by a measurement target, in which the distance measuring method includes, by the light emission control unit, individually controlling light emission and extinction of the light source of the plurality of transmission beams, by the optical deflection unit, deflecting the transmission beams at angles depending on the frequencies, and by the detection unit, detecting an interference beam generated by interference with a reception beam received by reflection of the transmission beams by a measurement target.

In one aspect of the present disclosure, light emission and extinction of the light source of the plurality of transmission beams are individually controlled, the transmission beams are deflected at angles depending on the frequencies, and an interference beam generated by interference with a reception beam received by reflection of the transmission beams by a measurement target is detected.

BRIEF DESCRIPTION OF DRAWINGS

FIG. 3 is a diagram describing a configuration example of a circuit unit in FIG. 1.

FIG. 7 is a diagram describing codes for controlling light emission recorded in a light emission control table.

FIG. 15 is a diagram describing a configuration example of a general-purpose personal computer.

MODE FOR CARRYING OUT THE INVENTION

Figure 1:
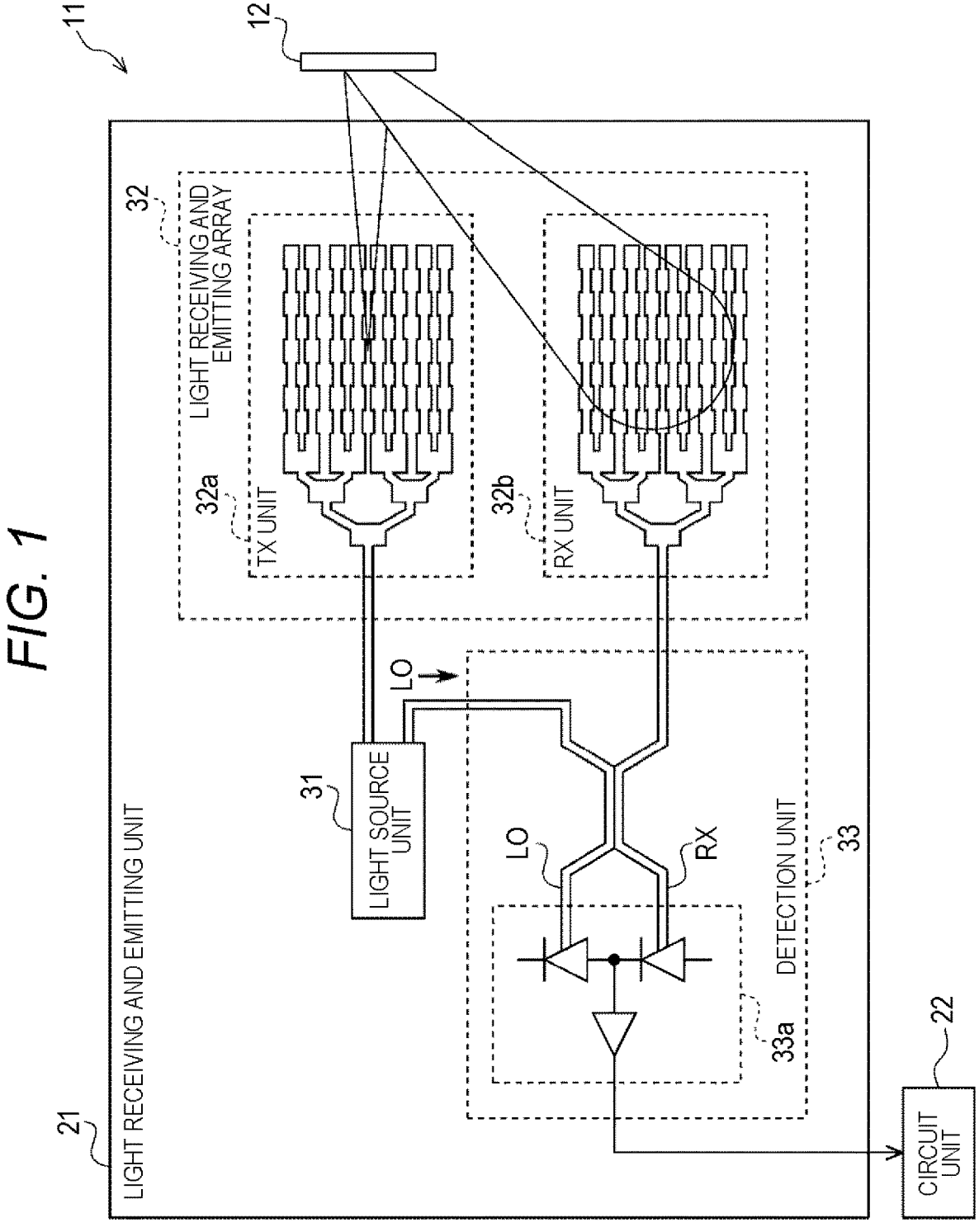
FIG. 1 is a diagram describing a configuration example of a distance measuring device for describing an overview of a coherent LiDAR.

Hereinafter, preferred embodiments of the present disclosure will be described in detail with reference to the accompanying drawings. Note that in the description and the drawings, components having substantially the same functional configuration are denoted by the same reference numerals, and redundant descriptions are omitted.

Hereinafter, a mode for carrying out the present technology will be described. The description will be made in the following order.

1. Overview of Coherent LiDAR
2. Preferred Embodiment
3. First Modification
4. Second Modification
5. Third Modification
6. Example of Execution by Software

1. Overview of Coherent LiDAR

The present disclosure achieves a distance measuring device with high accuracy at low cost. Accordingly, first, in describing the distance measuring device of the present disclosure, an overview of coherent LiDAR will be described.

The distance measuring device 11 in FIG. 1 is a distance measuring device that employs a distance measuring method called a coherent LiDAR (Light Detection and Ranging, Laser Imaging Detection and Ranging), and implements distance measurement by causing interference of a reception beam with a local oscillation beam that is a reference beam having a frequency slightly different from that of a transmission beam and measuring a beat frequency obtained from generated interference beam.

Since the coherent LiDAR can selectively select the reception beam close to the reference beam to implement distance measurement, the coherent LiDAR is hardly affected by external light as compared with a conventional time of flight (ToF) LiDAR, and can implement distance measurement with higher accuracy.

The distance measuring device 11 includes a light receiving and emitting unit 21 and a circuit unit 22. The light receiving and emitting unit 21 generates a transmission beam to be emitted toward a measurement target 12 to irradiate the measurement target 12, receives a reflected beam from the measurement target 12 as the reception beam, causes interference with the reference beam slightly different from the transmission beam, and outputs a generated interference beam to the circuit unit 22.

More specifically, the light receiving and emitting unit 21 includes a light source unit 31, a light receiving and emitting array 32, and a detection unit 33.

The light source unit 31 generates coherent light of a single frequency (bandwidth <1 MHz), generates a transmission beam TX of a plurality of channels having a predetermined frequency difference on the basis of the generated coherent light, performs chirp modulation (for example, ±1 GHz/10 usec) for linearly changing the frequency with respect to time, multiplexes the coherent light, and outputs the multiplexed beam to the light receiving and emitting array 32 via the optical waveguide.

The light source unit 31 generates local oscillation beam LO (Local Oscillation) of a plurality of channels having a frequency extremely slightly different from the frequency of the transmission beam TX by a predetermined frequency as a reference beam, performs chirp modulation similarly to the transmission beam TX, multiplexes the light, and outputs the multiplexed beam to the detection unit 33 via the optical waveguide. Note that details of the light source unit 31 will be described later with reference to FIG. 2.

The light receiving and emitting array 32 includes a transmission unit (TX unit) 32a and a reception unit (RX unit) 32b, irradiates the measurement target 12 with the transmission beam TX, receives a reflected beam reflected by the measurement target 12, and outputs the reflected beam as the reception beam RX to the detection unit 33.

The transmission unit (TX unit) 32a has an array-like configuration including an optical deflector whose emission angle depends on an optical frequency, deflects the multiplexed transmission beam TX in different directions depending on a frequency of each channel, and simultaneously projects the transmission beam TX to a visual field including the measurement target for measuring a distance and a relative speed.

The reception unit (RX unit) 32b has an array-like configuration including an optical deflector in which an incident angle depends on an optical frequency, and simultaneously receives a reflected beam of the transmission beam TX from the measurement target and outputs the reflected beam as the reception beam RX to the detection unit 33 via an optical waveguide.

With such a configuration, the light receiving and emitting array 32 can gain the number of measurement points (point/sec) per second of the distance measuring device depending on the number of channels, and improves the frame rate and resolution.

The detection unit 33 includes a detection circuit 33a, and causes the local oscillation beam LO supplied from the light source unit 31 and the reception beam RX supplied from the light receiving and emitting array 32 to interfere with each other, detects an interference beam having a difference frequency between the both, and outputs the interference beam to the circuit unit 22.

More specifically, the detection circuit 33a includes a balanced photodetector (PD) 33a-1 and an amplifier circuit 33a-2. The balanced photodetector (PD) 33a-1 includes photodiodes (PD) 33a-1-1 and 33a-1-2.

The photodiodes (PD) 33a-1-1 and 33a-1-2 are connected in series with each other, and generate currents depending on the amounts of the local oscillation beam LO and the reception beam RX, respectively. The balanced photodetector (PD) 33a-1 amplifies intermediate outputs of the photodiodes (PD) 33a-1-1 and 33a-1-2 by the amplifier circuit 33a-2, and outputs the amplified intermediate outputs to the circuit unit 22 as a signal of an interference beam including a difference frequency between the local oscillation beam LO and the reception beam RX.

The circuit unit 22 measures a beat frequency that is a difference frequency between the local oscillation beam LO and the reception beam RX for each channel from the interference beam between the local oscillation beam LO and the reception beam RX, and thereby measures the distance to the measurement target and the relative speed with the measurement target on the basis of the measured beat frequency. Note that the configuration of the circuit unit 22 will be described later in detail with reference to FIG. 3.

<Configuration Example of Light Source Unit>

Next, a configuration example of the light source unit 31 in FIG. 1 will be described. The light source unit 31 includes a light emission control unit 51, a TX unit 52, an LO unit 53, and optical MUXs 54 and 55.

The light emission control unit 51 controls the TX unit 52 to generate multi-channel single frequency laser (SFL) beams, and perform chirp modulation on each of the laser light and output the laser light to the optical MUX 54.

The optical MUX 54 multiplexes the chirp-modulated multi-channel single frequency laser (SFL) beams supplied from the TX unit 52 to generate the transmission beam TX, and outputs the transmission beam TX to the light receiving and emitting array 32 via the optical waveguide.

The light emission control unit 51 controls the LO unit 53 to generate multi-channel single frequency laser (SFL) beams having frequencies that are very slightly different from the frequency of the transmission beam TX, and perform chirp modulation on each of the laser beams and output the laser beams to the optical MUX 54.

The optical MUX 55 multiplexes the chirp-modulated multi-channel single frequency laser (SFL) beams supplied from the LO unit 53 to generate the local oscillation beam LO, and outputs the local oscillation beam LO to the detection unit 33 via a waveguide.

Figure 2:
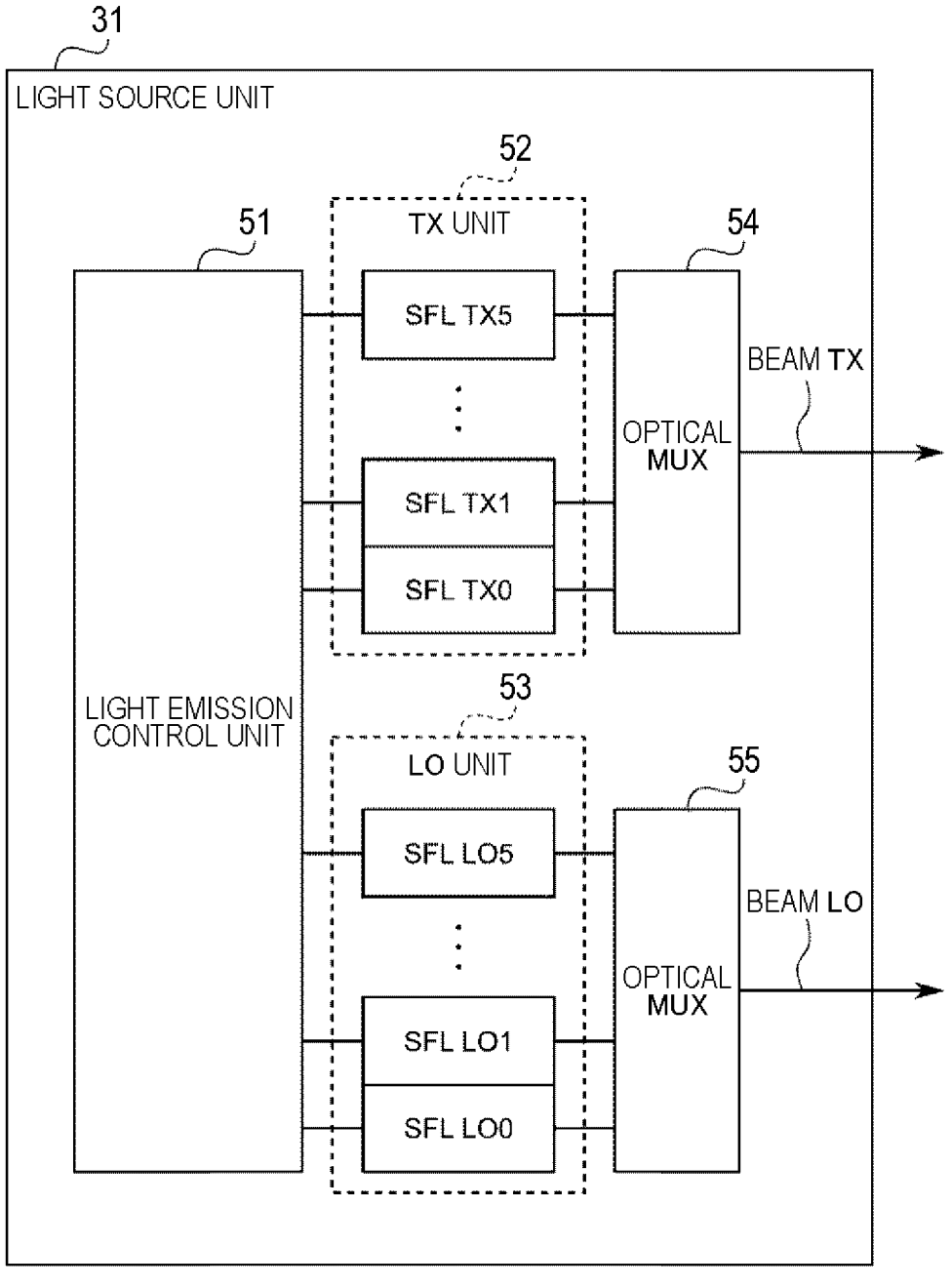
FIG. 2 is a diagram describing a configuration example of a light source unit in FIG. 1.

Note that, in the example of FIG. 2, an example is illustrated in which the TX unit 52 and the LO unit 53 generate transmission beams TX0 to TX5 and local oscillation beams LO0 to LO5 for six channels of the channels 0 to 5, respectively, but the number of channels may be other than six.

<Configuration Example of Circuit Unit>

Next, a configuration example of the circuit unit 22 will be described with reference to FIG. 3.

The circuit unit 22 includes an RF unit 71, a combining unit 72, a signal processing unit 73, and an estimation unit 74.

The radio frequency (RF) unit 71 includes a plurality of oscillators, generates an active current (AC) signal necessary for a frequency shift corresponding to a frequency difference between the local oscillation beam LO and the transmission beam TX of each channel, and outputs the generated signal to the combining unit 72.

The combining unit 72 multiplexes the AC signals corresponding to the frequency difference for each channel with the detection result of the interference beam between the local oscillation beam LO and the reception beam RX to perform frequency shift, extracts a signal of each channel, and outputs the signal to the signal processing unit 73.

The signal processing unit 73 includes a trans-impedance amplifier (TIA), an analog to digital converter (ADC), and a fast Fourier transform (FFT) for each channel, detects a beat frequency for each channel on the basis of signals of each channel supplied from the detection unit 33 and the combining unit 72, and outputs the beat frequency to the estimation unit 74.

The estimation unit 74 estimates (calculates) the distance to the measurement target and the relative speed on the basis of the beat frequency of each channel.

<Distance Measuring Method by Distance Measuring Device in FIG. 1>

Next, a distance measuring method by the distance measuring device 11 in FIG. 1 will be described with reference to FIGS. 4 and 5.

Figure 4:
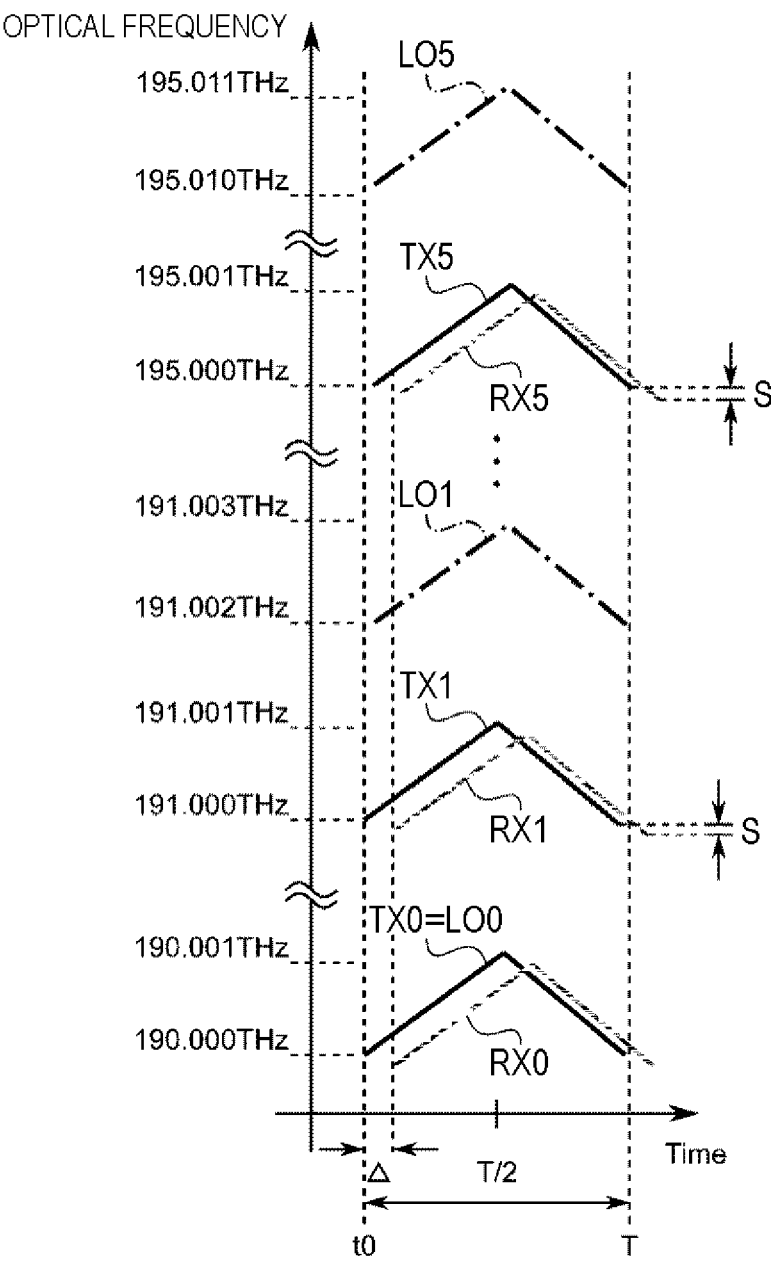
FIG. 4 is a diagram describing a method of estimating a distance and a relative speed of the distance measuring device in FIG. 1.

As described above, the transmission beam TX is obtained by multiplexing the transmission beams TX0 to TX5 including single frequency lasers (SFL) of six channels having different frequencies, and the optical frequency thereof is different for each predetermined frequency of each channel, and is different for each channel by 1 THz, for example, as illustrated in FIG. 4.

Note that FIG. 4 illustrates waveforms illustrating time-series optical frequency changes when each of the transmission beams TX0 to TX5 of the channels 0 to 5 is chirp-modulated, and respective waveforms denoted as TX0 to TX5 indicate time-series optical frequency changes of the transmission beams TX0 to TX5.

Furthermore, since the frequency of the transmission beam TX is linearly chirp-modulated with respect to time, for example, when a modulation bandwidth (height difference of the optical frequency) is set to 1 GHz and a section of one period of chirp modulation is set to time 0 to T, the transmission beam TX is expressed by a chevron waveform that rises to 1 GHz at a predetermined rate until time T/2, which is an intermediate timing of one cycle as indicated by a black solid line in FIG. 4, and then falls at a predetermined rate.

In a case where the transmission beam TX is a multiplexed beam in which the transmission beams TX0 to TX5 including six-channel single frequency lasers (SFL) are multiplexed, the local oscillation beam LO is a multiplexed beam in which the local oscillation beams LO0 to LO5 including single frequency lasers (SFL) having frequencies slightly different from the frequency of the transmission beam TX are multiplexed.

The difference between the frequency of each channel of the local oscillation beam LO and the frequency of each channel of the transmission beam TX is set to a different value depending on the channel number, for example, the channel number (0 to 5)×2 GHz, and the frequency difference is strictly kept constant by the light emission control unit 51 including the variation due to the chirp modulation.

In FIG. 4, for example, a lowest frequency as a reference of the local oscillation beam LO0 of the channel 0 is 190.000 THz, a lowest frequency as a reference of the transmission beam TX0 of the channel 1 is 190.000 THz, a difference between the both is zero, and the chevron waveform, which is changed by the chirp modulation, also keeps a matched waveform that is a chevron shape having a peak at time T/2 and the difference between the both is zero GHz.

Furthermore, a lowest frequency as a reference of the local oscillation beam LO1 is 191.000 THz, a lowest frequency as a reference of the transmission beam TX1 is 191.002 THz, a difference between the both is 2 (=channel 1×2 GHz) GHz, and the chevron waveform, which is changed by the chirp modulation, also keeps a matched waveform that is a chevron shape having a peak at time T/2 and the difference between the both is 2 GHz.

Moreover, a lowest frequency as a reference of the local oscillation beam LO5 is 195.000 THz, a lowest frequency as a reference of the transmission beam TX5 is 195.010 THz, a difference between the both is 10 (=channel 5×2 GHz) GHz, and the chevron waveform, which is changed by the chirp modulation, also keeps a matched waveform that is a chevron shape having a peak at time T/2 and the difference between the both is 10 GHz.

On the other hand, the reception beams RX0 to RX5 have respective waveforms in which a delay time Δ (=ToF) occurs in a time direction (horizontal axis direction in FIG. 4) with respect to the transmission beams TX0 to TX5 depending on the distance to the measurement target 12.

Moreover, on the reception beams RX0 to RX5, a shift S occurs in a frequency direction (vertical axis direction in FIG. 4) with respect to the transmission beams TX0 to TX5 due to an optical Doppler shift depending on the relative speed with respect to the measurement target 12. Therefore, FIG. 4 illustrates an example in which the shift S occurs by a predetermined value, but if the relative speed is zero, the shift S becomes zero, and there is no deviation in the frequency direction.

As described above, the detection unit 33 mixes the reception beam RX and the local oscillation beam LO and causes interference thereof, and extracts a difference frequency thereof as an interference wave.

Figure 3:
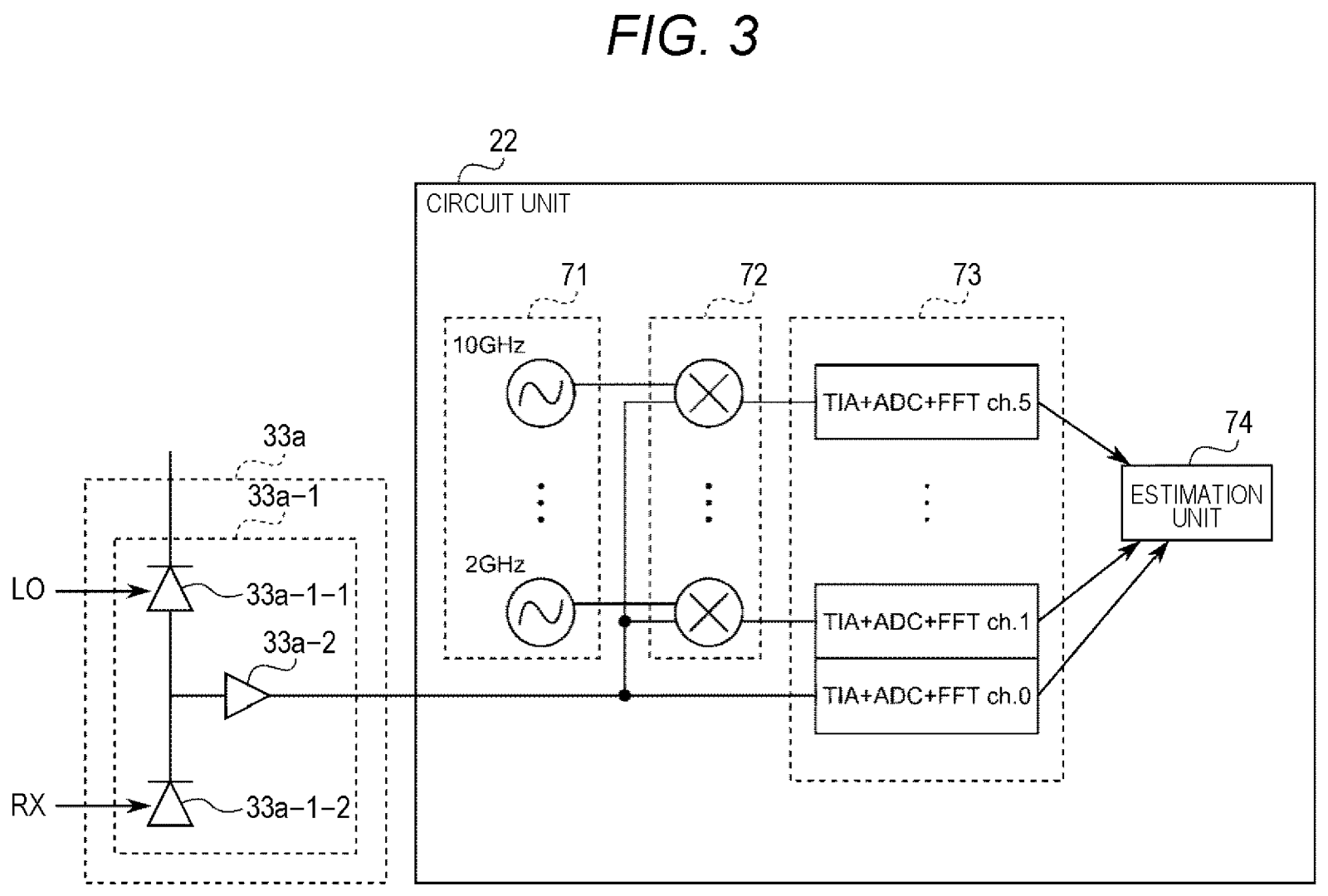

At this time, in the detection circuit 33a, frequency components exceeding cutoff frequencies of the photodiodes (PD) 33a-1-1 and 33a-1-2 constituting the balanced photo-detector (PD) 33a-1 are removed, and thus, from the output of the detection circuit 33a (outputs from intermediate terminals of the two series-connected photodiodes (PD) 33a-1-1 and 33a-1-2 constituting the balanced PD 33a-1 in the detection circuit 33a of FIG. 3), a waveform is output in which a difference frequency fd0 between the local oscillation beam LO0 and the reception beam RX0, a difference frequency fd1 between the local oscillation beam LO1 and the reception beam RX1, a difference frequency fd2 between the local oscillation beam LO2 and the reception beam RX2, a difference frequency fd3 between the local oscillation beam LO3 and the reception beam RX3, a difference frequency fd4 between the local oscillation beam LO4 and the reception beam RX4, and a difference frequency fd5 between the local oscillation beam LO5 and the reception beam RX5 are superimposed.

The output from the detection circuit 33a is combined with an alternating current (AC) signal (for example, channels (0 to 5)×2 GHz) depending on the channel number generated by the RF unit 71 in the combining unit 72, thereby being frequency-shifted and subjected to signal processing by the signal processing unit 73 for each channel.

That is, the frequency-shifted signal is converted from an AC current to an AC voltage by a trans-impedance amplifier (TIA), converted from an analog signal to digital by an analog to digital converter (ADC), converted from a digital signal sequence to a frequency spectrum by FFT (fast Fourier transform), and a beat frequency of each channel is detected.

The estimation unit 74 estimates (calculates) the distance to the measurement target and the relative speed on the basis of the beat frequency for each channel obtained in this manner.

<Method for Estimating Distance and Relative Speed Based on Beat Frequency>

Figure 5:
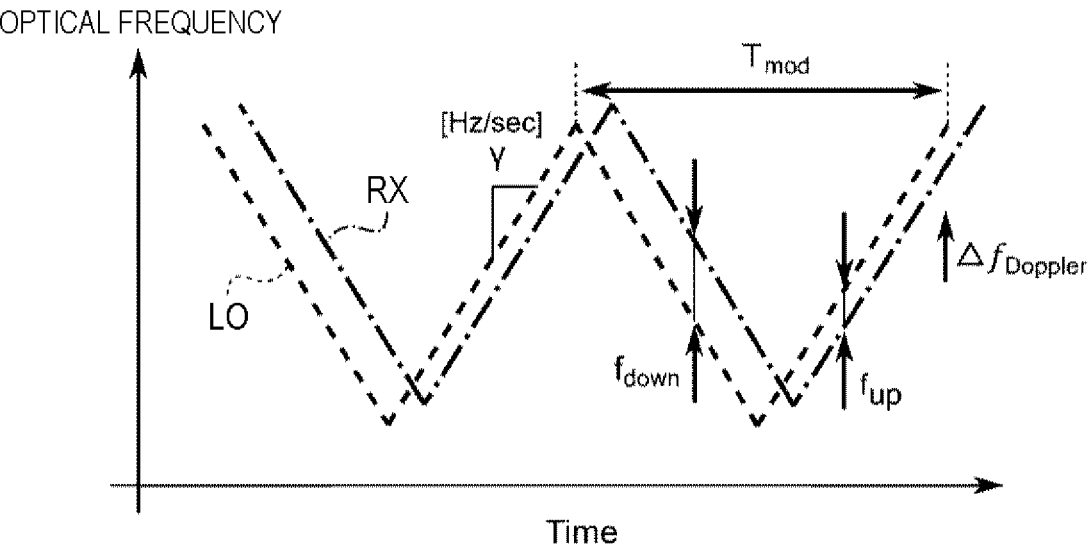
FIG. 5 is a diagram describing a method of estimating a distance and a relative speed based on a beat frequency.

In a case where the optical frequencies in the time direction of the local oscillation beam LO and the reception beam RX are indicated by, for example, waveforms of a dotted line and an alternate long and short dash line illustrated in FIG. 5, the relationship between the beat frequency and the round-trip time of light from the position (measurement position) of the distance measuring device 11 to the measurement target 12 is expressed by the following Expression (1).

[Expression 1]

$$f_{down} + f_{up} = 2\gamma\tau \tag{1}$$

Here, $f_{down}$ is a beat frequency (in down chirp modulation) in a state where a frequency change due to the chirp modulation illustrated in FIG. 5 is decreased, and $f_{up}$ is a beat frequency (in up chirp modulation) in a state where a frequency change due to the chirp modulation illustrated in FIG. 5 is increased.

Furthermore, γ represents a chirp speed, and since the chirp modulation changes linearly as illustrated in FIG. 5, γ represents a slope of this change.

Moreover, τ is a round-trip time of light from the position (measurement position) of the distance measuring device 11 to the measurement target 12, and is what is called time of flight (ToF).

That is, the distance d from the position (measurement position) of the distance measuring device 11 to the measurement target 12 is obtained by τc/2 when high speed is c.

That is, the distance d from the position (measurement position) of the distance measuring device 11 to the measurement target 12 can be calculated (estimated) by multiplying the sum of the beat frequency in the up chirp modulation and the beat frequency in the down chirp modulation by the light speed c, and dividing the multiplied value by 4 times the chirp speed γ.

On the other hand, the relationship between the beat frequency and the relative speed of the distance measuring device 11 with respect to the measurement target 12 is expressed by the following Expression (2).

[Expression 2]

$$f_{down} - f_{up} = 2\Delta f_{Doppler} = 2v/\lambda_{laser} \tag{2}$$

Here, $\Delta f_{Doppler}$ is a frequency change amount due to the Doppler shift, and $\lambda_{laser}$ is the wavelength of the frequency of the single frequency laser.

That is, the difference between the beat frequency in the up chirp modulation and the beat frequency in the down chirp modulation is twice the frequency change amount $\Delta f_{Doppler}$ due to the Doppler shift, and is obtained by dividing twice the relative speed v by the wavelength $\lambda_{laser}$ of the single frequency laser.

That is, the relative speed v of the position (measurement position) of the distance measuring device 11 with respect to the measurement target 12 can be calculated (estimated) by dividing the difference between the beat frequency in the up chirp modulation and the beat frequency in the down chirp modulation by 2 and multiplying the result by the wavelength $\lambda_{laser}$ of the single frequency laser.

Incidentally, while the coherent LiDAR is achieved by the distance measuring device 11 in FIG. 1 described above, in the light source unit 31, each of the transmission beam TX and the local oscillation beam LO is generated for a plurality of channels, and accordingly, twice as many light sources as the number of channels serving as light sources are necessary and thus the cost of the device increases.

Furthermore, unless the frequency difference between the local oscillation beam LO of the plurality of channels and the transmission beam TX is accurately kept constant, the measurement accuracy of the distance and the relative speed tends to deteriorate. Accordingly, it is necessary to increase the accuracy of the configuration of the light source unit 31 for maintaining advanced frequency control, and the cost also increases.

Moreover, the cutoff frequency in the configuration of the detection unit 33 and the circuit unit 22 needs to be, for example, about 10 GHz at the time of multiplexing of six channels as described above, and in order to achieve these, it is necessary to increase the accuracy of the configuration of the detection unit 33 and the circuit unit 22. Thus, the cost of the device increases, and it is inevitable to increase the cost for achieving further multiplexing.

Furthermore, in a case where the oscillator of the RF unit 71 includes a component (spurious harmonic) other than a desired frequency component, channel separation becomes incomplete, and the measurement accuracy of the distance and the relative speed decreases. Thus, it is necessary to increase the accuracy of the oscillator of the RF unit 71 and the combining unit 72, and the cost also increases.

Accordingly, the present disclosure employs a configuration in which, by sharing the light sources of the local oscillation beam LO and the transmission beam TX and individually controlling light emission and extinction for each channel within a chirp modulation cycle, frequency multiplexing and frequency separation can be performed even if the light sources of the local oscillation beam LO and the transmission beam TX are the same.

Consequently, it is possible to increase the point/sec at lower cost, and it is possible to achieve the distance measuring device including the coherent LiDAR capable of measuring the distance to the measurement target and the relative speed with high accuracy at lower cost.

2. Preferred Embodiment

<Configuration Example of Distance Measuring Device of Present Disclosure>

Next, a configuration example of the distance measuring device of the present disclosure will be described with reference to the block diagram of FIG. 6. Note that, in FIG. 6, a solid line between components represents an optical waveguide, and a dotted line represents a signal line.

Figure 6:
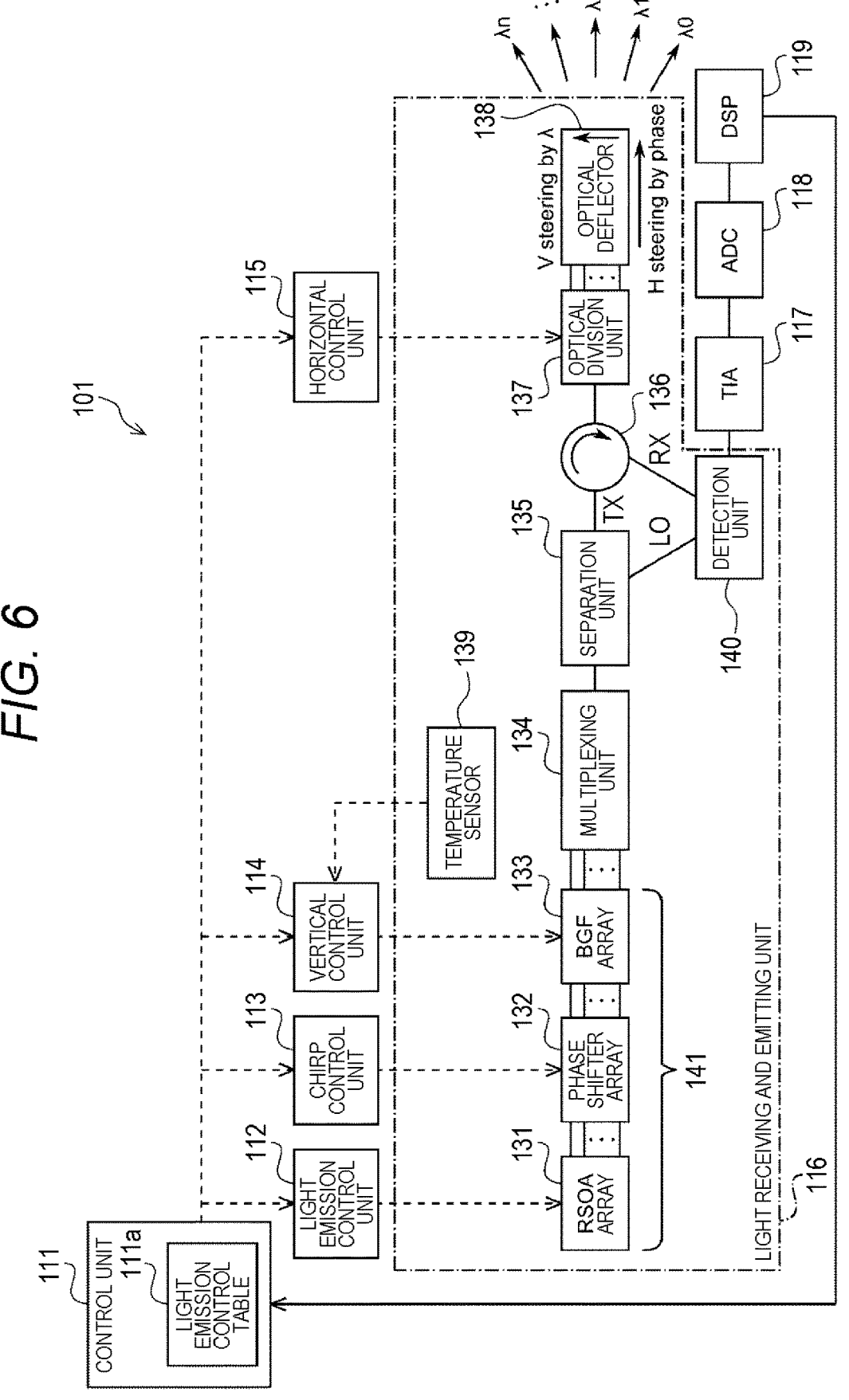
FIG. 6 is a diagram describing a configuration example of a distance measuring device of the present disclosure.

The distance measuring device 101 in FIG. 6 is a coherent LiDAR that generates transmission beams of a plurality of channels, receives a reflected beam from a measurement target as a reception beam, generates an interference beam by causing interference with a local oscillation beam as a reference beam separated from the transmission beam, and obtains a beat frequency from the interference beam to achieve the distance measurement and the relative speed.

More specifically, the distance measuring device 101 includes a control unit 111, a light emission control unit 112, a chirp control unit 113, a vertical control unit 114, a horizontal control unit 115, a light receiving and emitting unit 116, a TIA 117, an ADC 118, and a DSP 119.

The control unit 111 includes a processor, a memory, and the like, and controls the entire operation of the distance measuring device 101.

The control unit 111 controls the light emission control unit 112, the chirp control unit 113, the vertical control unit 114, and the horizontal control unit 115.

The control unit 111 includes a control table 111a that stores light emission and extinction of an RSOA array 131 and code information for controlling a phase shifter array 132, and controls the light emission control unit 112 and the chirp control unit 113 on the basis of the information of a control table 111a.

The light emission control unit 112 is controlled by the control unit 111 on the basis of the control table 111a, and controls light emission and extinction of the RSOA array 131 of the light receiving and emitting unit 116 for each channel.

The chirp control unit 113 is controlled by the control unit 111 on the basis of the control table 111a to control the modulation cycle and the modulation bandwidth of the chirp modulation of the phase shifter array 132 of the light receiving and emitting unit 116, to cause the light emission frequency of each channel to increase or decrease.

The vertical control unit 114 controls a BGF array 133 of the light receiving and emitting unit 116 to roughly control an oscillation frequency of each channel, thereby controlling the emission direction in the vertical direction (V: Vertical) depending on the frequency of each channel of the transmission beam TX in an optical deflector 138.

The horizontal control unit 115 controls a micro-semiconductor heater provided in an optical division unit 137 to control a phase shift amount, thereby controlling the emission direction of the transmission beam TX in the horizontal direction (H: Horizontal) in the optical deflector 138 that is the last stage.

The light receiving and emitting unit 116 generates the transmission beam TX that is emitted to the measurement target and receives a reflected beam from the measurement target as a reception beam, detects an interference beam between the transmission beam and the reception beam, and outputs the interference beam to the TIA 117 as an RF signal.

The optical device group constituting the light receiving and emitting unit 116 is preferably integrated as a Photonic IC on a semiconductor substrate. Furthermore, silicon-on-insulator (SOI) may be used as the semiconductor substrate.

The TIA (Trans Impedance Amplifier) 117 converts the RF signal of the interference beam detected by the light receiving and emitting unit 116 into a voltage amplitude, and outputs the voltage amplitude to the ADC 118.

The analog-to-digital converter (ADC) 118 digitizes the voltage amplitude of the RF signal supplied from the TIA 117 at a predetermined sampling period, and outputs the digitized RF signal to the DSP 119 as a reception signal sequence.

The digital signal processor (DSP) 119 performs digital signal processing, for example, processing such as FFT (fast Fourier transformation) or discrete Fourier transform (DFT) on the digitized reception signal sequence to obtain a frequency spectrum of the interference beam including a difference frequency for each channel, detects a beat frequency, and supplies the beat frequency to the control unit 111.

The control unit 111 estimates (calculates) the distance measurement to the measurement target and the relative speed on the basis of the beat frequency thus obtained. Note that the method of measuring the distance to the measurement target and estimating the relative speed based on the beat frequency is similar to the method described with reference to FIG. 5.

The light receiving and emitting unit 116 includes the RSOA array 131, the phase shifter array 132, the BGF array 133, a multiplexing unit 134, a separation unit 135, an optical discrimination unit 136, the optical division unit 137, the optical deflector 138, a temperature sensor 139, and a detection unit 140.

The reflective semiconductor optical amplifier (RSOA) 131, the phase shifter array 132, and the bragg grating filter (BGF) array 133 function as a tunable single frequency laser (SFL) 141 capable of electrically finely adjusting an optical frequency in order to achieve frequency modulation (chirp modulation).

The tunable SFL 141 functions as a laser resonator as a whole by having a structure in which the RSOA array 131, the phase shifter array 132, and the BGF array 133 are connected in series.

That is, the RSOA array 131 amplifies the beam generated by the stimulated emission and outputs the amplified beam to the phase shifter array 132. The phase shifter array 132 transmits the beam generated by the RSOA array 131 to the BGF array 133.

The BGF array 133 reflects only a specific optical frequency component of the beam from the RSOA array 131 transmitted through the phase shifter array 132 to the RSOA array 131 and amplifies the beam again by the RSOA array 131.

The tunable single frequency laser (SFL) 141 functions as a laser resonator by repeating a series of amplification operations as described above to finally transmit the beam from the BGF array 133, and generates SFL of each channel.

The RSOA array 131 controls the light emission output by the applied current controlled by the light emission control unit 112. The BGF array 133 roughly adjusts its oscillation frequency (wavelength) by the applied current controlled by the light emission control unit 112 and emits light.

The phase shifter array 132 minutely changes the refractive index by the applied current controlled by the chirp control unit 113, finely adjusts the oscillation frequency, and performs what is called the chirp modulation.

The BGF array 133 is controlled by the vertical control unit 114 and independently controls the oscillation frequency of each channel.

That is, since the deflection in the vertical (V: Vertical) direction in the optical deflector 138, which is the last stage, depends on the optical frequency, by controlling the frequency (optical oscillation frequency) of the transmission beam TX including the SFL of each channel, the transmission beam TX can be projected at any angle in the vertical direction within a scannable range of the optical deflector 138. In this manner, by controlling the BGF array 133, the transmission beam TX can be simultaneously projected at different vertical angles independently for each of the plurality of channels.

The multiplexing unit 134 includes, for example, a multimode interferometer (MMI) or the like, multiplexes a plurality of transmission beams TX having different optical frequencies into one frequency multiplexed beam, and outputs the bean to the separation unit 135 from one optical waveguide.

The separation unit 135 sets a part of the transmission beam TX including the frequency multiplexed beam supplied from the multiplexing unit 134 as the local oscillation beam LO (separating at a predetermined ratio (for example, local oscillation beam LO:transmission beam TX=1:9) or the like), outputs the local oscillation beam LO to the detection unit 140, and outputs the transmission beam TX to the optical discrimination unit 136.

The optical discrimination unit 136 is an optical circuit having different light passing directions depending on the port, and emits the transmission beam TX from the port of the separation unit 135 to the port to the optical division unit 137, and emits the reception beam RX, which is a return beam from the port of the optical division unit 137, to the port to the detection unit 140.

The optical division unit 137 includes a port from one optical discrimination unit 136 and a plurality of ports on the side of the optical deflector 138, and is an optical circuit capable of branching the transmission beam TX incident from the port of the optical discrimination unit 136 and emitting the transmission beam TX to the plurality of ports to the optical deflector 138, and independently controlling the phase in each port on the side of the optical deflector 138.

The optical division unit 137 has a configuration in which, for example, a plurality of splitters (optical branching devices) and a plurality of micro-semiconductor heaters are provided inside, and controls the phase of each port by utilizing the fact that the refractive index of a heated waveguide changes due to a thermo-optical effect by controlling the heating temperatures of the micro-semiconductor heaters by the horizontal control unit 115.

The optical deflector 138 includes, for example, an optical phased array (OPA) or the like, a plurality of optical waveguides whose phases are controlled by the optical division unit 137 is arranged at predetermined intervals, and each of the optical waveguides has a structure constricted at predetermined intervals. With such a structure, the optical deflector 138 simultaneously emits the transmission beams TX of the plurality of channels having different optical frequencies toward the measurement target at different deflection angles in the vertical direction for each wavelength.

Note that, in FIG. 6, it is expressed that the transmission beams TX having frequencies different in each channel emitted by the optical deflector 138 are emitted as transmission beams having wavelengths $\lambda 1$ to $\lambda n$ corresponding to the frequencies of respective channels, for example, and here, n is 5 because the number of channels is 6.

Furthermore, for details of the optical phased array (OPA), refer to Realization of Integrated Coherent LiDAR, Taehwan Kim, UC Berkeley technical report, 2020 (http://www2.eecs.berkeley.edu/Pubs/TechRpts/2020/EECS-2020-38.pdf).

The temperature sensor 139 measures the temperature of the tunable SFL 141 and supplies the temperature information to the vertical control unit 114. In general, the optical frequency of the tunable SFL 141 has temperature dependency, and thus temperature compensation is necessary to keep the optical frequency constant.

The vertical control unit 114 has both the function of deflection control and the function of temperature compensation by adjusting the current or voltage to be applied to the BGF array 133 on the basis of the temperature information from the temperature sensor 139.

The temperature sensor 139 is desirably mounted as close as possible to the tunable SFL 141 on the Photonic IC constituting the light receiving and emitting unit 116.

The detection unit 140 includes an optical coupler and a photo detector (PD), mixes the local oscillation beam LO and the reception beam RX by an optical coupler, and converts the mixed light into an RF signal by the photo detector (PD). More specifically, the optical coupler in the detection unit 140 is, for example, a 180° hybrid 2×2 coupler, and the PD is, for example, a balanced photodiode (BPD) including a pair of two photodiodes having the same characteristics. The output of the PD is the output of the detection unit 140, and includes the difference frequency between the local oscillation beam LO and the reception beam RX.

Note that the configuration of the detection unit 140 is substantially similar to that of the detection circuit 33a described with reference to FIG. 3.

<Method for Measuring Distance to Measurement Target and Relative Speed by Distance Measuring Device in FIG. 6>

<Light Emission Control Table>

Next, light emission control of the RSOA array 131 by the light emission control unit 112 and chirp modulation control of the phase shifter array 132 by the chirp control unit 113 based on the light emission control table 111a will be described.

Figure 7:
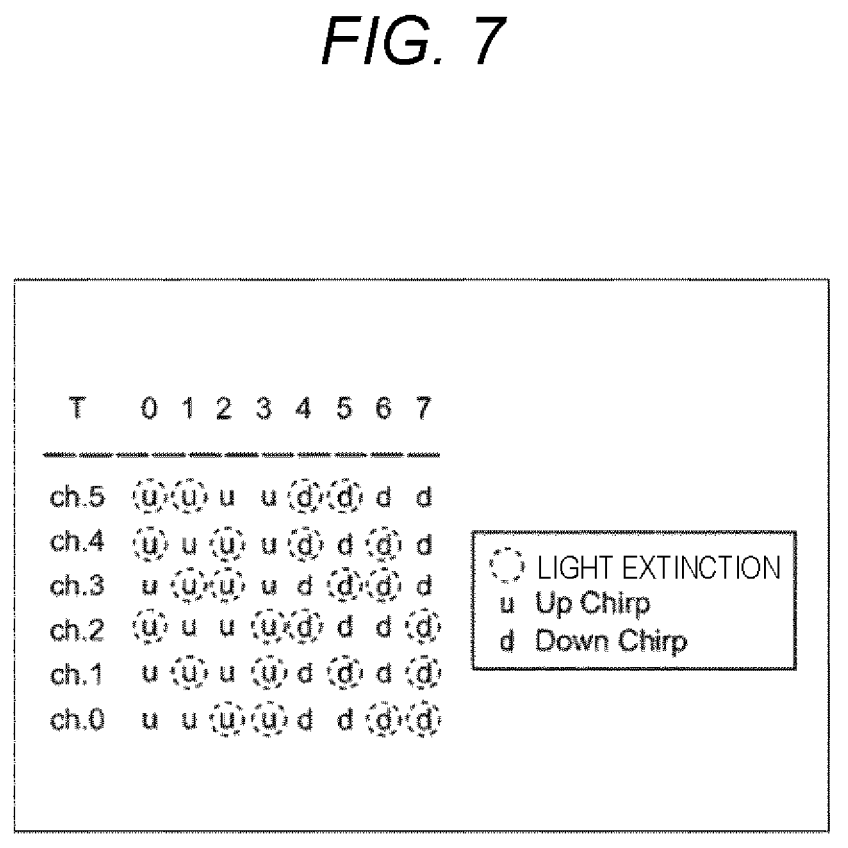

FIG. 7 is an example of codes tabulated and recorded in the light emission control table 111a. The codes tabulated and recorded in the light emission control table 111a of FIG. 7 are examples of codes obtained by coding control signals of light emission control and chirp modulation in a case where the six transmission beams TX0 to TX5 having different optical frequencies are multiplexed to be the transmission beam TX.

In the light emission control table 111a of FIG. 7, a horizontal axis represents time slots T0 to T7 obtained by dividing the modulation cycle of the chirp modulation control into eight equal parts, and a vertical axis represents an up chirp modulation period and a down chirp modulation period as well as a light emission period and a light extinction period of the transmission beams TX0 to TX5 in each of the time slots T0 to T7.

That is, in FIG. 7, "d" represents the down chirp modulation period, "u" represents the up chirp modulation period, a period not surrounded by a dotted circle is the light emission period, and a period surrounded by a dotted circle is the light extinction period.

Figure 8:
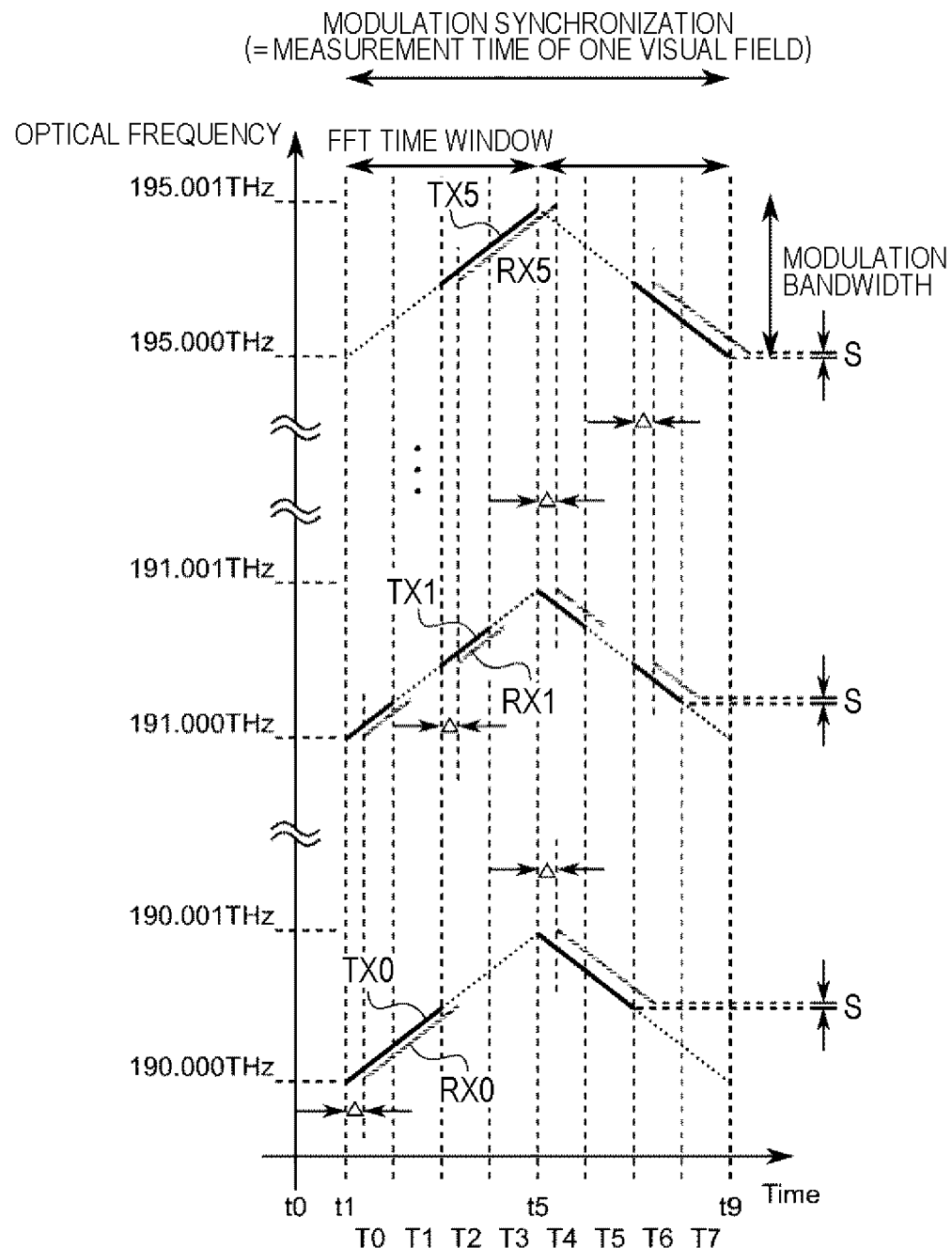
FIG. 8 is a diagram describing light emission control based on information of the light emission control table.

Furthermore, FIG. 8 illustrates a waveform example illustrating a time-series frequency change when the chirp modulation is performed on the six transmission beams TX0 to TX5 having different frequencies generated when light emission of the RSOA array 131 is controlled on the basis of the example of the codes tabulated and recorded in the light emission control table 111a of FIG. 7.

That is, in FIG. 8, for example, the lowest frequency as the reference of the transmission beam TX0 of the channel 0 is 190.000 THz, the lowest frequency as the reference of the transmission beam TX1 of the channel 1 is 191.000 THz, and the lowest frequency as the reference of the transmission beam TX5 of the channel 5 is 195.000 THz.

Furthermore, although not illustrated, a lowest frequency as a reference of the transmission beam TX2 of the channel 2 is 192.000 THz, a lowest frequency as a reference of the transmission beam TX3 of the channel 3 is 193.000 THz, and a lowest frequency as a reference of the transmission beam TX4 of the channel 4 is 194.000 THz.

Moreover, in FIG. 8, time t1 to t9 is one cycle of modulation synchronization of chirp modulation, in which time t1 to t5 is an up chirp period, and time t5 to t9 is a down chirp period. Furthermore, the modulation bandwidth is the same 1 GHz in the example of FIG. 8.

Then, time t1 to t2 corresponds to the time slot T0 in FIG. 7, time t2 to t3 corresponds to the time slot T1, time t3 to t4 corresponds to the time slot T2, and time t4 to t5 corresponds to the time slot T3.

Similarly, time t5 to t6 corresponds to the time slot T4, time t6 to t7 corresponds to the time slot T5, time t7 to t8 corresponds to the time slot T6, and time t8 to t9 corresponds to the time slot T7.

(Channel 0)

That is, in the channel 0 (Ch. 0) in FIG. 7, "u" is displayed in the time slots T0 and T1, indicating that the up chirp modulation is performed in a light emission state and at the predetermined rate, and "u" is displayed in a state surrounded by the dotted line in the time slots T2 and T3, indicating that the up chirp modulation is performed in a light extinction state and at the predetermined rate.

Furthermore, in the channel 0 (Ch. 0) in FIG. 7, "d" is displayed in the time slots T4 and T5, indicating that the down chirp modulation is performed in the light emission state and at the predetermined rate, and "d" is displayed in the state surrounded by the dotted line in the time slots T6 and T7, indicating that the down chirp modulation is performed in the light extinction state and at the predetermined rate.

Correspondingly, at time t1 to t3 corresponding to the time slots T0 and T1 in FIG. 8, as indicated by a straight line indicated by a solid line to which TX0 is attached, it is expressed that the frequency of the transmission beam TX0 of the channel 0 linearly rises at the predetermined rate from the lowest frequency 190.000 THz as the reference in the light emission state, and the up chirp modulation is performed.

Furthermore, at time t3 to t5 corresponding to the time slots T2 and T3 in FIG. 8, as indicated by a straight line indicated by a dotted line to which TX0 is attached, it is expressed that the optical frequency of the transmission beam TX0 of the channel 0 linearly rises at the predetermined rate from the frequency at time t3 in the light extinction state, and the up chirp modulation is performed.

Moreover, at time t5 to t7 corresponding to the time slots T4 and t5 in FIG. 8, as indicated by a straight line indicated by a solid line to which TX0 is attached, it is expressed that the frequency of the transmission beam TX0 of the channel 0 linearly decreases from the frequency at the time t5 in the light emission state, and the down chirp modulation is performed.

Furthermore, at time t7 to t9 corresponding to the time slots T6 and T7 in FIG. 8, as indicated by a straight line indicated by a dotted line to which TX0 is attached, it is expressed that the optical frequency of the transmission beam TX0 of the channel 0 linearly decreases at the predetermined rate from the frequency at time t7 to the lowest frequency 190.000 THz as the reference in the light extinction state, and the down chirp modulation is performed.

The transmission beam TX0 is reflected by the measurement target, and the obtained reception beam RX0 generates a delay A depending on the ToF (Time-of-flight: flight distance, that is, twice the distance to the measurement target), and the relationship between the time and the frequency is shifted to the right with respect to the transmission beam TX in FIG. 8. Furthermore, on the reception beam RX0, a shift S occurs in the frequency direction (vertical axis direction in FIG. 8) with respect to the transmission beam TX0 due to the optical Doppler shift depending on the relative speed with respect to the measurement target.

(Channel 1)

In the channel 1 (Ch. 1) of FIG. 7, "u" is displayed in the time slots T0 and T2, indicating that the up chirp modulation is performed in the light emission state and at the predetermined rate, and "u" is displayed in the state surrounded by the dotted line in the time slots T1 and T3, indicating that the up chirp modulation is performed in the light extinction state and at the predetermined rate.

Furthermore, in the channel 1 (Ch. 0) in FIG. 7, "d" is displayed in the time slots T4 and T6, indicating that the down chirp modulation is performed in the light emission state and at the predetermined rate, and "d" is displayed in the state surrounded by the dotted line in the time slots t5 and T7, indicating that the down chirp modulation is performed in the light extinction state and at the predetermined rate.

Correspondingly, at time t1 to t2 corresponding to the time slot T0 in FIG. 8, as indicated by a straight line indicated by a solid line to which TX1 is attached, it is expressed that the frequency of the transmission beam TX1 of the channel 1 linearly rises at the predetermined rate from the lowest frequency 191.000 THz as the reference in the light emission state, and the up chirp modulation is performed.

Furthermore, at time t2 to t3 corresponding to the time slot T1 in FIG. 8, as indicated by a straight line indicated by a dotted line to which TX1 is attached, it is expressed that the frequency of the transmission beam TX1 of the channel 1 linearly rises at the predetermined rate from the frequency at time t2 in the light extinction state, and the up chirp modulation is performed.

Moreover, at time t3 to t4 corresponding to the time slot T2 in FIG. 8, as indicated by a straight line indicated by a solid line to which TX1 is attached, it is expressed that the frequency of the transmission beam TX1 of the channel 1 linearly rises at the predetermined rate from the frequency at time t3 in the light emission state, and the up chirp modulation is performed.

Furthermore, at time t4 to t5 corresponding to the time slot T3 in FIG. 8, as indicated by a straight line indicated by a dotted line to which TX1 is attached, it is expressed that the frequency of the transmission beam TX1 of the channel 1 linearly rises at the predetermined rate from the frequency at time t4 in the light extinction state, and the up chirp modulation is performed.

Moreover, at time t5 to t6 corresponding to the time slot T4 in FIG. 8, as indicated by a straight line indicated by a solid line to which TX1 is attached, it is expressed that the frequency of the transmission beam TX1 of the channel 1 linearly decreases at the predetermined rate from the frequency at time t5 in the light emission state, and the down chirp modulation is performed.

Furthermore, at time t6 to t7 corresponding to the time slot T5 in FIG. 8, as indicated by a straight line indicated by a dotted line to which TX1 is attached, it is expressed that the frequency of the transmission beam TX1 of the channel 1 linearly decreases at the predetermined rate from the frequency at time t6 in the light extinction state, and the down chirp modulation is performed.

Moreover, at time t7 to t8 corresponding to the time slot T6 in FIG. 8, as indicated by a straight line indicated by a solid line to which TX1 is attached, it is expressed that the frequency of the transmission beam TX1 of the channel 1 linearly decreases at the predetermined rate from the frequency at time t7 in the light emission state, and the down chirp modulation is performed.

Furthermore, at time t8 to t9 corresponding to the time slot T7 in FIG. 8, as indicated by a straight line indicated by a dotted line to which TX1 is attached, it is expressed that the frequency of the transmission beam TX1 of the channel 1 linearly decreases at the predetermined rate from the frequency at time t8 to the lowest frequency 191.000 THz as the reference in the light extinction state, and the down chirp modulation is performed.

The transmission beam TX1 is reflected by the measurement target, and the obtained reception beam RX1 generates a delay A depending on the ToF (Time-of-flight: flight distance, that is, twice the distance to the measurement target), and the relationship between the time and the frequency is shifted to the right with respect to the transmission beam TX1 in FIG. 8. Furthermore, on the reception beam RX1, a shift S occurs in the frequency direction (vertical axis direction in FIG. 8) with respect to the transmission beam TX1 due to the optical Doppler shift depending on the relative speed with respect to the measurement target.

(Channel 5)

That is, in the channel 5 (Ch. 5) in FIG. 7, "u" is displayed in a state surrounded by a dotted line in the time slots T0 and T1, indicating that the up chirp modulation is performed in the light extinction state and at the predetermined rate, and "u" is displayed in the time slots T2 and T3, indicating that the up chirp modulation is performed in the light emission state and at the predetermined rate.

Furthermore, in the channel 5 (Ch. 5) in FIG. 7, "d" is displayed in a state surrounded by a dotted line in the time slots T4 and T5, indicating that the down chirp modulation is performed in the light extinction state and at the predetermined rate, and "d" is displayed in the time slots T6 and T7, indicating that the down chirp modulation is performed in the light emission state and at the predetermined rate.

Correspondingly, at time t1 to t3 corresponding to the time slots T0 and T1 in FIG. 8, as indicated by a straight line indicated by a dotted line to which TX5 is attached, it is expressed that the frequency of the transmission beam TX5 of the channel 5 linearly rises at the predetermined rate from the lowest frequency 195.000 THz as the reference in the light extinction state, and the up chirp modulation is performed.

Furthermore, at time t3 to t5 corresponding to the time slots T2 and T3 in FIG. 8, as indicated by a straight line indicated by a solid line to which TX0 is attached, it is expressed that the frequency of the transmission beam TX5 of the channel 5 linearly rises at the predetermined rate from the frequency at time t3 in the light emission state, and the up chirp modulation is performed.

Moreover, at time t5 to t7 corresponding to the time slots T4 and T5 in FIG. 8, as indicated by a straight line indicated by a dotted line to which TX5 is attached, it is expressed that the frequency of the transmission beam TX5 of the channel 5 linearly decreases at the predetermined rate from the frequency at time t5 in the light extinction state, and the down chirp modulation is performed.

Furthermore, at time t7 to t9 corresponding to the time slots T6 and T7 in FIG. 8, as indicated by a straight line indicated by a solid line to which TX0 is attached, it is expressed that the frequency of the transmission beam TX5 of the channel 5 linearly decreases at the predetermined rate from the frequency at time t7 to the lowest frequency 195.000 THz as the reference in the light emission state, and the down chirp modulation is performed.

The transmission beam TX5 is reflected by the measurement target, and the obtained reception beam RX5 generates a delay A depending on the ToF (Time-of-flight: flight distance, that is, twice the distance to the measurement target), and the relationship between the time and the frequency is shifted to the right with respect to the transmission beam TX5 in FIG. 8. Furthermore, on the reception beam RX5, a shift S occurs in the frequency direction (vertical axis direction in FIG. 8) with respect to the transmission beam TX5 due to the optical Doppler shift depending on the relative speed with respect to the measurement target.

Note that, in the channels 2 to 4, although not illustrated, light emission and chirp modulation are controlled as in the channels 0, 1, and 5, corresponding to the codes recorded in the light emission control table 111a of FIG. 7.

<Detection Using Reception Beam RX and Local Oscillation Beam LO>

Furthermore, the reception beam RX is converted into a radio frequency (RF) signal by the detection unit 140 using the local oscillation beam LO obtained by separating a part of the power of the reception beam RX from the same light source as the transmission beam TX by the separation unit 135.

The RF signal includes a beat frequency, which is a difference frequency between the local oscillation beam LO and the reception beam RX, for a plurality of channels. Since the frequencies of the local oscillation beam LO and the transmission beam TX are the same, the beat frequency may be rephrased as a difference frequency between the transmission beam TX and the reception beam RX.

By controlling the light emission on the basis of the codes of the light emission control table 111a in FIG. 7, in each time slot, only the component of the channel chirp-modulated in the light emission state is included in the RF signal.

Therefore, the RF signal of the time slot T0 includes respective components of a difference frequency between the transmission beam TX0 and the reception beam RX0, a difference frequency between the transmission beam TX1 and the reception beam RX1, and a difference frequency between the transmission beam TX3 and the reception beam RX3 in the up chirp modulation.

Furthermore, the RF signal of the time slot T1 includes respective components of the difference frequency between the transmission beam TX0 and the reception beam RX0, a difference frequency between the transmission beam TX2 and the reception beam RX2, and a difference frequency between the transmission beam TX4 and the reception beam RX4 in the up chirp modulation.

Moreover, the RF signal of the time slot T2 includes respective components of the difference frequency between the transmission beam TX1 and the reception beam RX1, the difference frequency between the transmission beam TX2 and the reception beam RX2, and a difference frequency between the transmission beam TX5 and the reception beam RX5 in the up chirp modulation.

Moreover, the RF signal of the time slot T3 includes respective components of the difference frequency between the transmission beam TX3 and the reception beam RX3, the difference frequency between the transmission beam TX4 and the reception beam RX4, and the difference frequency between the transmission beam TX5 and the reception beam RX5 in the up chirp modulation.

Furthermore, the RF signal of the time slot T4 includes respective components of the difference frequency between the transmission beam TX0 and the reception beam RX0, the difference frequency between the transmission beam TX1 and the reception beam RX1, and the difference frequency between the transmission beam TX3 and the reception beam RX3 in the down chirp modulation.

Moreover, the RF signal of the time slot T5 includes respective components of the difference frequency between the transmission beam TX0 and the reception beam RX0, difference frequency between the transmission beam TX2 and the reception beam RX2, and the difference frequency between the transmission beam TX4 and the reception beam RX4 in the down chirp modulation.

Furthermore, the RF signal of the time slot T6 includes respective components of the difference frequency between the transmission beam TX1 and the reception beam RX1, the difference frequency between the transmission beam TX2 and the reception beam RX2, and the difference frequency between the transmission beam TX5 and the reception beam RX5 in the down chirp modulation.

Moreover, the RF signal of the time slot T7 includes the difference frequency between the transmission beam TX3 and the reception beam RX3, the difference frequency between the transmission beam TX4 and the reception beam RX4, and the difference frequency between the transmission beam TX5 and the reception beam RX5 in the down chirp modulation.

Accordingly, the TIA 117 and the ADC 118 digitize the RF signal in each of the time slots T0 to T7 at a predetermined sampling period, and output the digitized RF signal to the DSP 119 as reception signal sequences MT1 to MT7. The DSP 119 performs digital signal processing on the reception signal sequences MT1 to MT7 and separates the reception signal sequences MT1 to MT7 into frequency spectra for respective channels.

More specifically, the DSP 119 applies a window function unique for each channel to the reception signal sequences MT1 to MT7, and converts the signal sequence into a frequency spectrum for each channel by FFT (fast Fourier transform) processing (or discrete Fourier transform (DFT) processing).

As the simplest window function, for example, there is a rectangular window in which a reception signal is passed as it is for a time slot in a period in which light is emitted and the up chirp modulation is performed or a period in which the down chirp modulation is performed, and zero is set for a time slot in a period in which light is turned off and the up chirp modulation is performed or a period in which the down chirp modulation is performed.

The DSP 119 expresses the frequency spectrum corresponding to each channel as in Expression (3) by using the rectangular window, for example.

[Expression 3]

$$X_{ch.5,up}(\omega) = FFT(0, 0, M_{T2}, M_{T3}) \tag{3}$$

$$X_{ch.5,dn}(\omega) = FFT(0, 0, M_{T6}, M_{T7})$$

$$\vdots$$

$$X_{ch.1,up}(\omega) = FFT(M_{T0}, 0, M_{T2}, 0)$$

$$X_{ch.1,dn}(\omega) = FFT(M_{T4}, 0, M_{T6}, 0)$$

$$X_{ch.0,up}(\omega) = FFT(M_{T0}, M_{T1}, 0, 0)$$

$$X_{ch.0,dn}(\omega) = FFT(M_{T4}, M_{T5}, 0, 0)$$

Here, $X_{ch.A,\ up}(\omega)$ is a frequency spectrum to which the rectangular window of the channel A in the time slots T0 to T3 which are up chirp periods is applied. Furthermore, $X_{ch.A,\ dn}(\omega)$ is a frequency spectrum to which the rectangular window of the channel A in the time slots T4 to T7 which are down chirp periods is applied.

Furthermore, FFT (B, C, D, and E) is a frequency spectrum of each channel subjected to the FFT processing, B, C, D, and E are reception signal sequences of the time slots T0 to T3, respectively, in the down chirp period, and are reception signal sequences of the time slots T4 to T7, respectively, in the up chirp period. Furthermore, the $M_{TF}$ is a reception signal sequence of the time slot TF.

That is, for example, a frequency spectrum $X_{ch.0,\ up}(\omega)$ in the up chirp period of the channel 0 is a calculation result of FFT when the reception signal sequences of the time slots T0 and T1 during the light emission are MT0 and MT1, and the frequency spectra of the time slots T2 and T3 during the light extinction are zero.

Furthermore, for example, the frequency spectrum $X_{ch.0,\ down}(\omega)$ in the down chirp period of the channel 0 is a calculation result of FFT when the frequency spectra of the time slots T4 and 15 during emission are MT4 and MT5 and the frequency spectra of the time slots T6 and T7 during the light extinction are zero.

Moreover, for example, the frequency spectrum $X_{ch.1,\ up}(\omega)$ in the up chirp period of the channel 1 is a calculation result of FFT when the frequency spectra of the time slots T0 and T2 during the light emission are MT0 and MT2 and the frequency spectra of the time slots T1 and T3 during the light extinction are zero.

Furthermore, for example, the frequency spectrum $X_{ch.1, down}(\omega)$ in the down chirp period of the channel 1 is a calculation result of FFT when the frequency spectra of the time slots T4 and T6 during the light emission are MT4 and MT6 and the frequency spectra of the time slots 15 and T7 during the light extinction are zero. Note that it is similar for the channels 2 to 5.

<Method for Identifying Beat Frequency>

The control unit 111 estimates the beat frequency of each channel on the basis of the frequency spectrum obtained in this manner.

Figure 9:
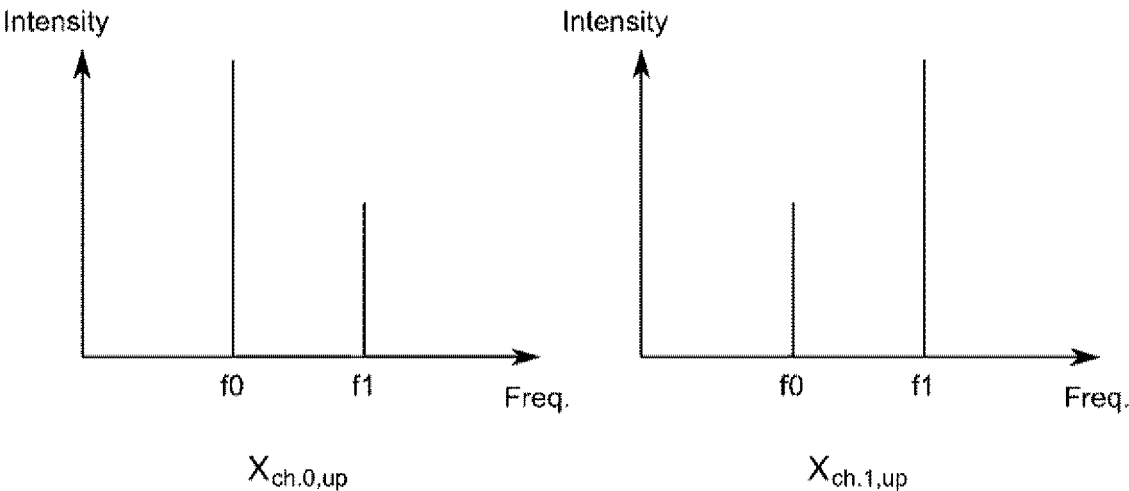
FIG. 9 is a diagram describing how to obtain a beat frequency.

For example, it is considered a case where the frequency spectra $X_{ch.0, up}(\omega)$ and $X_{ch.1, up}(\omega)$ in the up chirp modulation periods of the channels 0 and 1 are a left part and a right part of FIG. 9, respectively.

The left part of FIG. 9 illustrates that, in the frequency spectrum $X_{ch.0, up}(\omega)$ of the channel 0, there are peaks at the frequencies f0 and f1, and the frequency f0 is a peak higher than the frequency f1.

Furthermore, the right part of FIG. 9 illustrates that, also in the frequency spectrum $X_{ch.1, up}(\omega)$ of the channel 1, there are peaks at the frequencies f0 and f1, and the frequency f1 is a peak higher than the frequency f0.

Thus, it can be determined from the result of FIG. 9 that the beat frequency of the channel 0 is the frequency f0 and the beat frequency of the channel 1 is the frequency f1.

Note that, although the example of the channels 0 and 1 has been described in the example of FIG. 9, the channels 2 to 5 can also be determined similarly.

Furthermore, in the example of FIG. 9, only the up chirp modulation period is illustrated, but a frequency having the highest peak height, which is the spectrum intensity in the frequency spectrum, can be determined as the beat frequency by also using the frequency spectrum in the down chirp modulation period.

The control unit 111 estimates (calculates) the distance to the measurement target and the relative speed by the method described with reference to FIG. 5 on the basis of the information of the beat frequency of each channel specified by the method described with reference to FIG. 9.

By the above method, light emission and extinction, and chirp modulation are performed by changing light emission and extinction of the transmission beams TX0 to TX5 of the plurality of channels in combination of time slots within one chirp modulation cycle, whereby it is possible to measure the beat frequency by separating the local oscillation beam LO and the transmission beam TX for each channel even if the local oscillation beam LO and the transmission beam TX are made common by one light source, and to achieve the measurement of distance to the measurement target and the measurement of the relative speed.

Thus, even if the local oscillation beam LO and the transmission beam TX are the same light source, the transmission beam TX of multiple channels having different frequencies can be multiplexed and separated, and the point/sec can be increased even if the device configuration is simplified.

Consequently, it is possible to achieve a coherent LiDAR with high accuracy at low cost.

<Measurement Processing>

Figure 10:
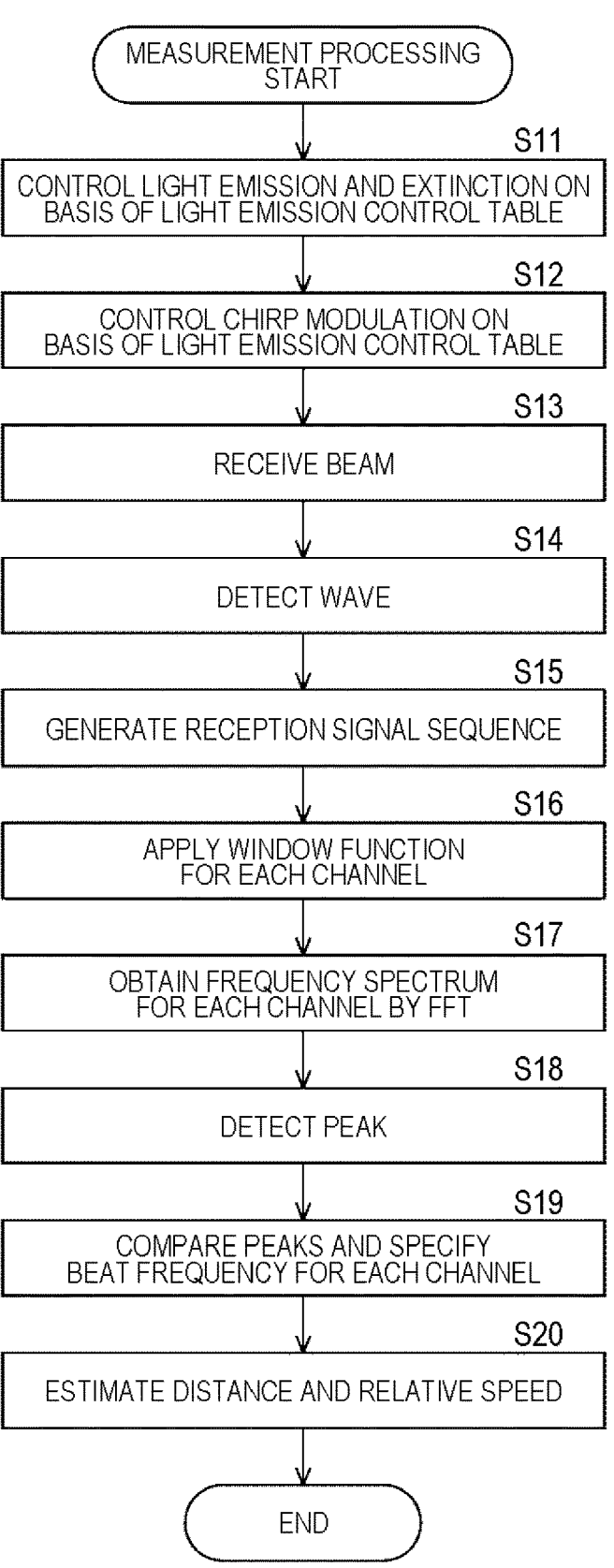
FIG. 10 is a flowchart describing measurement processing by the distance measuring device in FIG. 6.

Next, measurement processing by the distance measuring device 101 of FIG. 6 will be described with reference to a flowchart of FIG. 10.

In step S11, the light emission control unit 112 is controlled by the control unit 111 on the basis of the information of the light emission control table 111a, and controls light emission and extinction of the RSOA array 131.

In step S12, the chirp control unit 113 is controlled by the control unit 111 on the basis of the information of the light emission control table 111a, and controls the optical frequency by the phase shifter array 132 to control chirp modulation.

Note that, in the BGF array 133, the vertical direction of the transmission beam TX emitted from the optical deflector 138, which is the last stage, is controlled in advance by the vertical control unit 114.

In the optical division unit 137, the horizontal direction of the transmission beam TX emitted from the optical deflector 138, which is the last stage, is controlled in advance by the horizontal control unit 115.

Then, the tunable SFL 141 including the RSOA array 131, the phase shifter array 132, and the BGF array 133 generates the transmission beams TX0 to TX5 of the plurality of channels having different frequencies in an array shape and outputs the transmission beams TX0 to TX5 to the multiplexing unit 134.

The multiplexing unit 134 multiplexes the transmission beams TX0 to TX5 of the plurality of channels into one multiplexed beam and outputs the multiplexed beam as the transmission beam TX to the separation unit 135.

The separation unit 135 separates a part of the transmission beam TX at a predetermined ratio as the local oscillation beam LO and outputs the separated part to the detection unit 140, and outputs the remaining transmission beam TX to the optical discrimination unit 136.

The optical discrimination unit 136 transmits the transmission beam from the separation unit 135 to the optical division unit 137.

The optical division unit 137 divides the transmission beam TX supplied from the optical discrimination unit 136 so as to correspond to the horizontal direction controlled by the horizontal control unit 115, and outputs the transmission beam TX to the optical deflector 138.

The optical deflector 138 deflects the divided transmission beam TX at an angle in the vertical direction depending on the frequencies of respective channels multiplexed into one multiplexed beam, and simultaneously emits the transmission beam TX.

In step S13, the optical deflector 138 receives the reflected beam of the plurality of channels generated by the transmission beam TX of the plurality of channels being reflected by the measurement target, multiplexes the reflected beam as one reception beam RX, and outputs the combined beam to the optical division unit 137.

The optical division unit 137 multiplexes the reception beam RX including the reception beam of the plurality of channels into one and outputs the combined reception beam RX to the optical discrimination unit 136.

The optical discrimination unit 136 discriminates the reception beam RX from the optical division unit 137, and outputs the reception beam RX to the detection unit 140.

In step S14, the detection unit 140 mixes the reception beam RX including the plurality of channels with the local oscillation beam LO to generate an interference wave having a difference frequency between the local oscillation beam LO (transmission beam TX) and the reception beam RX, converts the interference wave into an RF signal, and outputs the RF signal to the TIA 117.

In step S15, the TIA 117 converts the RF signal into a voltage amplitude and outputs the voltage amplitude to the ADC 118. The ADC 118 digitizes the voltage amplitude of the RF signal at a predetermined sampling period to generate a reception signal sequence for each channel, and outputs the reception signal sequence to the DSP 119.

In step S16, the DSP 119 applies the window function to the reception signal sequence for each channel.

In step S17, the DSP 119 obtains a frequency spectrum for each channel by applying FFT to the reception signal sequence to which the window function is applied.

In step S18, the DSP 119 detects the peak frequency of each channel on the basis of the frequency spectrum.

In step S19, the DSP 119 compares the peak intensities of the obtained peak frequencies, specifies the beat frequency for each channel on the basis of the comparison result, and outputs the beat frequency to the control unit 111.

In step S20, the control unit 111 estimates the distance to the measurement target and the relative speed on the basis of the information of the beat frequency of each channel supplied from the DSP 119.

Through the above processing, the light emission and extinction, and the chirp modulation are controlled for each channel by the codes stored in the light emission control table 111a, and the transmission beam TX of each channel is emitted. Furthermore, the beat frequency is specified on the basis of the peak frequency of each channel of the frequency spectrum obtained by performing the FFT processing on the reception signal sequence based on the RF signal obtained from the interference wave including the difference frequency between the transmission beam TX and the reception beam RX, and the distance and the relative speed are estimated.

Thus, even if the local oscillation beam LO and the transmission beam TX are the same light source, the transmission beams TX of multiple channels having different frequencies can be multiplexed and separated, so that the device configuration can be simplified.

Consequently, it is possible to increase the point/sec even with a simple configuration, and thus it is possible to achieve a highly accurate coherent LiDAR at low cost.

Note that, although the example of the case where the number of channels is six has been described above, the number of channels may be other than six.

For example, the number of channels may be set on the basis of the number of time slots in which the chirp modulation is performed in the light emission state with respect to the total number of time slots in the period in which the window function is applied.

That is, as described with reference to FIG. 8, in a case where the number of time slots to which the window function is applied is four, and the number of time slots in which chirp modulation is performed in the light emission state is two, for example, $_4C_2=6$ channels is obtained by an operation using a combination.

Therefore, for example, in a case where the number of time slots to which the window function is applied is six and the number of time slots in which the chirp modulation is performed in the light emission state is three, $_6C_3=20$ channels is obtained by the calculation using the combination.

However, as the number of channels increases, the number of measurement points (points/sec) per unit time can be increased, so that the resolution and the frame rate can be increased. On the other hand, the structure of the light source and the separation of spectrum becomes complicated depending on the number of channels.

Moreover, the window function is not limited to the above-described rectangular window and may be another window function, for example, a Gaussian window, a Hann window, a Hamming window, a Kaiser window, or the like.

3. First Modification

Figure 11:
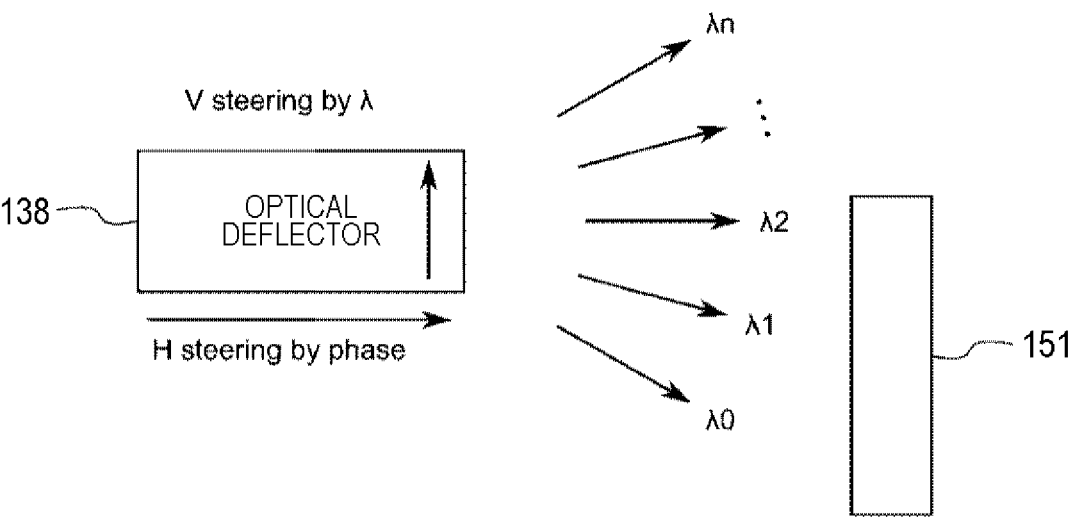
FIG. 11 is a diagram describing a first modification.

For example, as illustrated in FIG. 11, in a case of the measurement target 151 having a large size in the vertical axis direction, the measurement targets having the same speed and the same distance can be detected over a plurality of channels.

In the distance measuring device 101 of FIG. 6, the modulation bandwidth (the difference between the maximum value and the minimum value of the frequency) of each channel is set to, for example, 1 GHz, but if a plurality of channels has the same modulation bandwidth of 1 GHz, there is a concern that peaks of the same frequency and the same intensity appear in spectra of the plurality of channels, and separation becomes difficult.

Accordingly, in order to prevent this, it is possible to reduce the possibility that separation of a plurality of channels becomes difficult by setting a unique modulation bandwidth in each channel so that a difference equal to or larger than the frequency resolution of FFT is obtained so as to set the modulation bandwidth of each channel to, for example, 1.00 GHz for the transmission beam TX0, 1.01 GHz for the transmission beam TX1, 1.02 GHz for the transmission beam TX2, 1.03 GHz for the transmission beam TX3, 1.04 GHz for the transmission beam TX4, and 1.05 GHz for the transmission beam TX5.

That is, if the modulation bandwidth is different for each channel, even if the measurement target at the same speed and the same distance spans multiple channels, it is detected as the beat frequency different for each channel, so that the measurement target can be correctly detected.

4. Second Modification

In the distance measuring device 101 of FIG. 6, an example has been described in which, in a case where there is a plurality of frequency peaks in a frequency spectrum corresponding to a channel, the frequency indicating the highest peak intensity is determined to be the beat frequency of the channel.

Furthermore, in the first modification described above, an example has been described in which the possibility that the same beat frequency is simultaneously detected for a plurality of channels is reduced by using different modulation bandwidths for each channel.

Even if the first modification described above is applied, there may be a case where the same beat frequency is detected simultaneously in a plurality of channels, although the probability is low. Even in such a case, which frequency is the beat frequency of which channel can be estimated to some extent on the basis of the peak intensity of the frequency spectrum corresponding to each channel.

Figure 12:
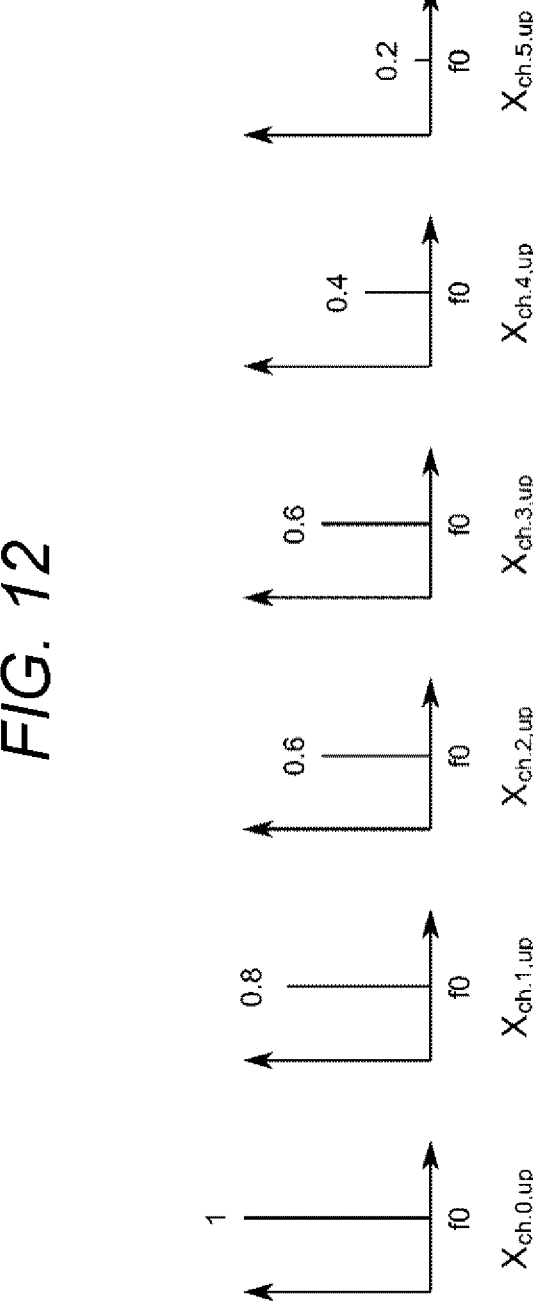
FIG. 12 is a diagram describing a second modification.

For example, FIG. 12 illustrates a frequency spectrum of each channel in a case where a measurement target having the same beat frequency is detected in the channels 0 and 1 and the light intensity of the reception beam RX1 of the channel 1 is half of the light intensity of the reception beam RX0 of the channel 0.

Note that the numbers added above each peak in FIG. 12 represent the spectrum intensity, and represent that the spectrum intensity of the frequency f0 in the frequency spectrum $X_{ch.0, up}$ of the channel 0 is 1, and represent on the right side that, thereafter, the spectrum intensity of the frequency f0 in the frequency spectra $X_{ch.1, up}$ to $X_{ch.5, up}$ of the channels 1 to 5 is 0.6, 0.6, 0.4, and 0.4 in order from the left.

In FIG. 12, the beat frequency f0 exhibits a peak in the frequency spectrum of any channel, but it can be determined that the first measurement target has been detected in the channel 0 having the highest spectrum intensity.

Here, if the measurement target is detected only in the channel 0, from the coding example of the light emission control table 111a of FIG. 7, a peak of about half the intensity of the channel 0 appears in the frequency spectrum of the channels 1 to 4 emitting light in one of the time slots T0 and T1, and the frequency f0 should not be detected in the channel 5 not sharing the light emission period with the channel 0.

However, since the channel 5 exhibits a weak peak for the frequency f0, it can be determined that there is a measurement target indicating the frequency f0 other than the channel 0.

The peak of the frequency f0 of the channel 1 is the second highest after the peak of the frequency f0 of the channel 0.

Accordingly, when it is estimated that the same beat frequency has been detected in both the channels 0 and 1, and the intensity of the reception beam RX0 is assumed as 0.8 (0.4 in time slot T0 and 0.4 in time slot T1) and the intensity of the reception beam RX1 is assumed as 0.4 (0.2 in time slot T0 and 0.2 in time slot T2), it can be specified by predetermined estimation processing that the frequency spectrum of each channel matches the frequency spectrum illustrated in FIG. 12.

Figure 13:
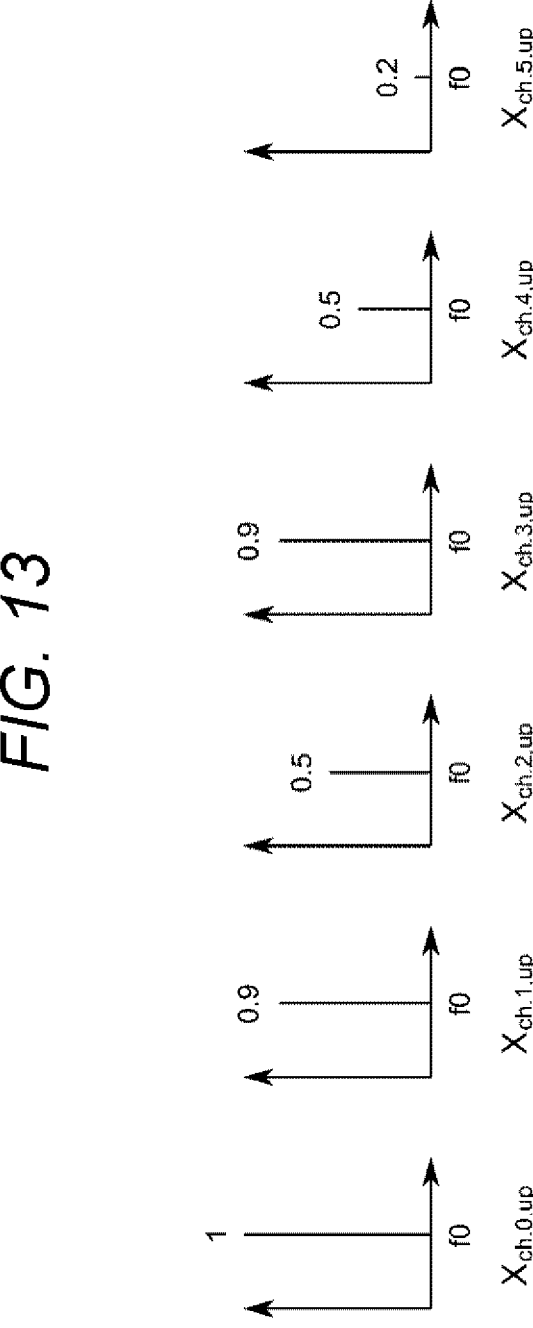
FIG. 13 is a diagram describing the second modification.

As another example, FIG. 13 illustrates a frequency spectrum of each channel in a case where a measurement target having the same beat frequency is detected in three channels.

In the case of FIG. 13, when it is estimated that the same frequency f0 has been detected as the beat frequency in the channels 0, 1, and 3, and the intensity of the reception beam RX0 is assumed as 0.6 (0.3 in time slot T0 and 0.3 in time slot T1), the intensity of the reception beam RX1 is assumed as 0.4 (0.2 in time slot T0 and 0.2 in time slot T2), and the intensity of the reception beam RX3 is assumed as 0.4 (0.2 in time slot T0 and 0.2 in time slot T3), matching of the frequency spectrum of each channel with the frequency spectrum of FIG. 13 can be specified by predetermined estimation processing.

The predetermined estimation processing described above may be based on a deterministic algorithm, or may use machine learning or convolutional neural network (CNN).

5. Third Modification

In the distance measuring device 101 of FIG. 6, an example in which the OPA capable of two-dimensional (2D) steering is used as the optical deflector 138 has been described, but a configuration other than the OPA may be used as the optical deflector 138.

For example, a prism and a rotary mirror may be provided instead of the optical deflector 138.

Figure 14:
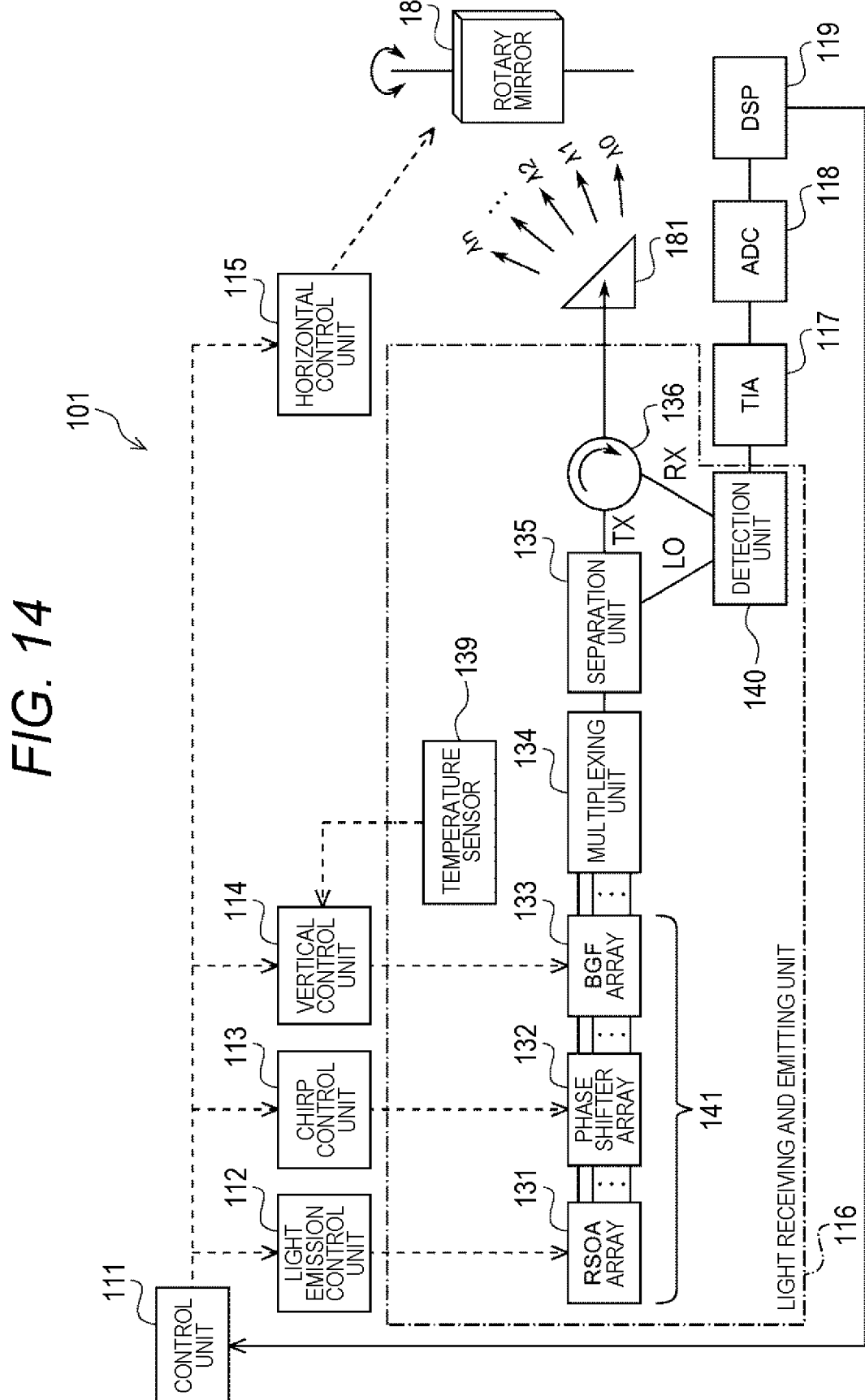
FIG. 14 is a diagram describing a third modification.

FIG. 14 illustrates a configuration example of the distance measuring device 101 in which a prism and a rotary mirror are provided instead of the optical deflector 138.

The distance measuring device 101 of FIG. 14 is different from the distance measuring device 101 of FIG. 6 in that a prism 181 and a rotary mirror 182 are provided instead of the optical deflector 138.

The prism 181 is one of optical elements whose emission angle depends on the optical frequency, and emits the transmission beams TX of a plurality of channels having different frequencies in the vertical direction.

Furthermore, the rotary mirror 182 is a mirror configured to be rotatable with respect to the horizontal direction about an axis in the vertical direction, is controlled by the horizontal control unit 115, can implement scanning with respect to the horizontal direction of the transmission beam TX, and can perform 2D scanning as in a case of using the optical deflector 138 including the OPA.

Note that the other configurations of the distance measuring device 101 in FIG. 14 are similar to those of the distance measuring device 101 in FIG. 6, and thus the description thereof will be omitted.

Furthermore, measurement processing by the distance measuring device 101 in FIG. 14 is also different from that of the distance measuring device 101 in FIG. 6 only in the method related to the emission of the transmission beam TX, and thus the description thereof will be omitted.

6. Example Executed by Software

Incidentally, the series of processes described above can be executed by hardware, but can also be executed by software. In a case where the series of processes is executed by software, a program constituting the software is installed from a recording medium into, for example, a computer built into dedicated hardware or a general-purpose computer that is capable of executing various functions by installing various programs, or the like.

Figure 15:
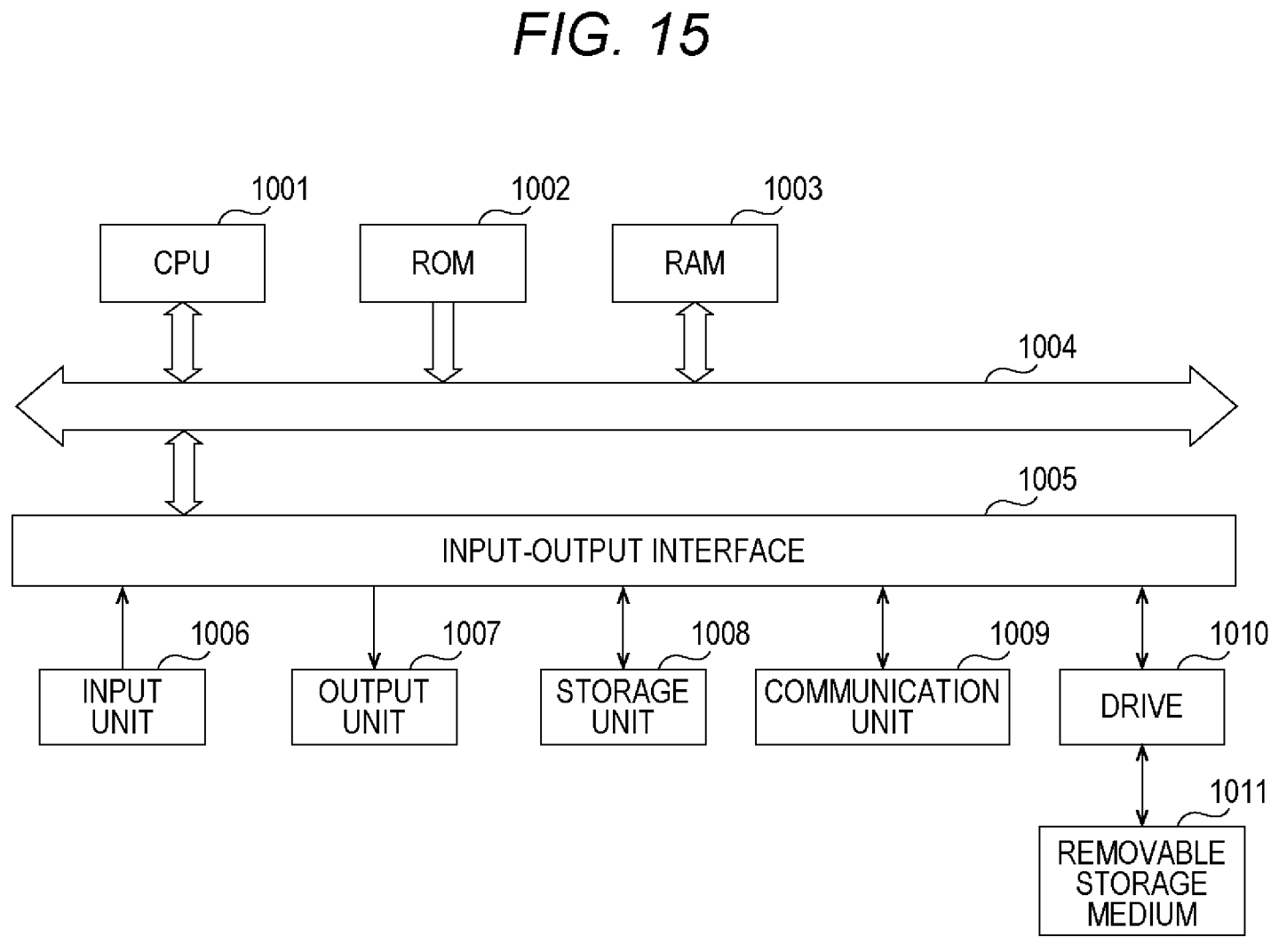

FIG. 15 illustrates a configuration example of a general-purpose computer. This personal computer includes a central processing unit (CPU) 1001. An input-output interface 1005 is connected to the CPU 1001 via a bus 1004. A read only memory (ROM) 1002 and a random access memory (RAM) 1003 are connected to the bus 1004.

To the input-output interface 1005, an input unit 1006 including an input device such as a keyboard and a mouse by which a user inputs operation commands, an output unit 1007 that outputs a processing operation screen and an image of a processing result to a display device, a storage unit 1008 that includes a hard disk drive and the like and stores programs and various data, and a communication unit 1009 including a local area network (LAN) adapter or the like and executes a communication process via a network represented by the Internet are connected. Furthermore, a drive 1010 that reads and writes data from and to a removable storage medium 1011 such as a magnetic disk (including a flexible disk), an optical disk (including a compact disc-read only memory (CD-ROM), a digital versatile disc (DVD)), a magneto-optical disk (including a Mini Disc (MD)), or a semiconductor memory is connected.

The CPU 1001 executes various processes in accordance with a program stored in the ROM 1002, or a program read from the removable storage medium 1011 such as a magnetic disk, an optical disk, a magneto-optical disk, or semiconductor memory, installed in the storage unit 1008, and loaded from the storage unit 1008 into the RAM 1003. The RAM 1003 also appropriately stores data necessary for the CPU 1001 to execute various processes, and the like.

In the computer configured as described above, for example, the CPU 1001 loads the program stored in the storage unit 1008 into the RAM 1003 via the input-output interface 1005 and the bus 1004 and executes the program, to thereby perform the above-described series of processes.

The program executed by the computer (CPU 1001) can be provided by being recorded in the removable storage medium 1011 as a package medium or the like, for example. Furthermore, the program can be provided via a wired or wireless transmission medium such as a local area network, the Internet, or digital satellite broadcasting.

In the computer, the program can be installed in the storage unit 1008 via the input-output interface 1005 by mounting the removable storage medium 1011 to the drive

1010. Furthermore, the program can be received by the communication unit 1009 via a wired or wireless transmission medium and installed in the storage unit 1008. In addition, the program can be installed in the ROM 1002 or the storage unit 1008 in advance.

Note that the program executed by the computer may be a program for processing in time series in the order described in the present description, or a program for processing in parallel or at a necessary timing such as when a call is made.

Note that the CPU 1001 in FIG. 15 implements the functions of the control unit 111, the light emission control unit 112, the chirp control unit 113, the vertical control unit 114, and the horizontal control unit 115 in FIGS. 6 and 14.

Furthermore, in the present description, a system means a set of a plurality of components (devices, modules (parts), and the like), and it does not matter whether or not all components are in the same housing. Therefore, both of a plurality of devices housed in separate housings and connected via a network and a single device in which a plurality of modules is housed in one housing are systems.

Note that embodiments of the present disclosure are not limited to the above-described embodiments, and various modifications are possible without departing from the scope of the present disclosure.

For example, the present disclosure can have a configuration of cloud computing in which one function is shared by a plurality of devices via a network and processing is performed in cooperation.

Furthermore, each step described in the above-described flowcharts can be executed by one device, or can be executed in a shared manner by a plurality of devices.

Moreover, in a case where a plurality of processes is included in one step, the plurality of processes included in the one step can be executed in a shared manner by a plurality of devices in addition to being executed by one device.

Note that the present disclosure can also have the following configurations.

<1> A distance measuring device, including:

a light source of a plurality of transmission beams;

a light emission control unit that individually controls light emission and extinction of the light source of the plurality of transmission beams;

an optical deflection unit that deflects the transmission beams at angles depending on the frequencies; and a detection unit that detects an interference beam generated by interference with a reception beam received by reflection of the transmission beams by a measurement target.

<2> The distance measuring device according to <1>, in which the light emission control unit controls the light source of the plurality of transmission beams at different respective frequencies, and the optical deflection unit deflects the plurality of transmission beams at different respective frequencies at angles depending on the frequencies and simultaneously projects the plurality of transmission beams to a plurality of visual fields.

<3> The distance measuring device according to <2>, in which the plurality of transmission beams at the different frequencies is multiplexed into one multiplexed transmission beam, and the optical deflection unit deflects each of the plurality of transmission beams multiplexed in the multiplexed transmission beam at an angle depending on the frequency and simultaneously projects the plurality of transmission beams onto a plurality of visual fields.

<4> The distance measuring device according to <3>, further including:

a separation unit that separates a part of the multiplexed transmission beam as a local oscillation beam, in which the detection unit detects an interference beam generated by interference between the reception beam and the local oscillation beam.

<5> The distance measuring device according to <2>, further including:

a modulation unit that modulates frequencies of the plurality of transmission beams at a predetermined modulation cycle, in which the light emission control unit controls light emission and extinction in a unique pattern for each of light sources of the plurality of transmission beams in units of a plurality of time sections when the modulation cycle is divided into the time sections.

<6> The distance measuring device according to <5>, further including:

a light emission control table in which a code in which a unique pattern for the each of the light sources of the plurality of transmission beams is coded is registered, in which the light emission control unit controls light emission and extinction in a unique pattern for the each of the light sources of the plurality of transmission beams in units of the time sections on the basis of a code registered in the light emission control table.

<7> The distance measuring device according to <5>, in which a number of light sources of the plurality of transmission beams is set on the basis of a number of divisions when the modulation cycle is divided into a plurality of time sections and a number of time sections in which light emission or extinction in the modulation cycle is set.

<8> The distance measuring device according to <7>, in which the number of light sources of the plurality of transmission beams is set on the basis of a combination of a number of divisions when the modulation cycle is divided into a plurality of time sections and a number of time sections in which light emission or extinction in the modulation cycle is set.

<9> The distance measuring device according to <5>, in which the modulation unit modulates frequencies of the plurality of transmission beams with same respective modulation bandwidths.

<10> The distance measuring device according to <5>, in which the modulation unit modulates frequencies of the plurality of transmission beams with different respective modulation bandwidths.

<11> The distance measuring device according to <10>, in which a distance and a relative speed of a measurement target are estimated on the basis of a plurality of frequency spectra respectively corresponding to the light sources of the plurality of transmission beams, the plurality of frequency spectra being obtained by extracting a reception signal sequence corresponding to a time section in which the light sources of the plurality of transmission beams emit light from a reception signal sequence obtained by photoelectric conversion of an output of the detection unit and performing discrete Fourier transform on the reception signal sequence, and the modulation unit modulates the frequencies of the plurality of transmission beams with different respective modulation bandwidths to be equal to or higher than a frequency resolution in the discrete Fourier transform.

<12> The distance measuring device according to <1>, in which a distance and a relative speed of a measurement target are estimated on the basis of a plurality of frequency spectra respectively corresponding to light sources of the plurality of transmission beams, the plurality of frequency spectra being obtained from an output of the detection unit.

<13> The distance measuring device according to <12>, in which a distance and a relative speed of the measurement target are specified on the basis of a beat frequency specified from a plurality of frequency spectra respectively corresponding to the light sources of the plurality of transmission beams obtained from the output of the detection unit.

<14> The distance measuring device according to <13>, in which the beat frequency is specified on the basis of comparison of magnitude of peaks of the plurality of frequency spectra respectively corresponding to the light sources of the plurality of transmission beams, obtained from the output of the detection unit.

<15> The distance measuring device according to <12>, in which the plurality of frequency spectra respectively corresponding to the light sources of the plurality of transmission beams is obtained by extracting a reception signal sequence corresponding to a time section in which the light sources of the plurality of transmission beams emit light from a reception signal sequence obtained by photoelectric conversion of an output of the detection unit and performing discrete Fourier transform on the reception signal sequence.

<16> The distance measuring device according to any one of <1> to <15>, in which the optical deflection unit is an optical phased array (OPA).

<17> The distance measuring device according to any one of <1> to <15>, in which the optical deflection unit includes a prism and a rotary mirror.

<18> The distance measuring device according to any one of <1> to <17>, in which the distance measuring device is coherent light detection and ranging, laser imaging detection and ranging (LiDAR).

<19> A distance measuring method of a distance measuring device including:

a light source of a plurality of transmission beams;

a light emission control unit that individually controls light emission and extinction of the light source of the plurality of transmission beams;

an optical deflection unit that deflects the transmission beams at angles depending on the frequencies; and a detection unit that detects an interference beam generated by interference with a reception beam received by reflection of the transmission beams by a measurement target, in which the distance measuring method includes:

by the light emission control unit, individually controlling light emission and extinction of the light source of the plurality of transmission beams;

by the optical deflection unit, deflecting the transmission beams at angles depending on the frequencies; and by the detection unit, detecting an interference beam generated by interference with a reception beam received by reflection of the transmission beams by a measurement target.

<20> A program for a computer that controls a distance measuring device including:

a light source of a plurality of transmission beams;

a light emission control unit that individually controls light emission and extinction of the light source of the plurality of transmission beams;

an optical deflection unit that deflects the transmission beams at angles depending on the frequencies; and a detection unit that detects an interference beam generated by interference with a reception beam received by reflection of the transmission beams by a measurement target, in which the program causing the computer to function as the light emission control unit that individually controls light emission and extinction of the light source of the plurality of transmission beams.

REFERENCE SIGNS LIST

101 Distance measuring device
111 Control unit
111a Light emission control table
112 Light emission control unit
113 Chirp control unit
114 Vertical control unit
115 Horizontal control unit
116 Light receiving and emitting unit
117 TIA
118 ADC
119 DSP
131 RSOA mask
132 Phase shifter array
133 BGF array
134 Multiplexing unit
135 Separation unit
136 Optical discrimination unit
137 Optical division unit
138 Optical deflector
139 Temperature sensor
140 Detection unit
141 Tunable SFL
181 Prism
182 Rotary mirror

The invention claimed is:

1. A distance measuring device, comprising:

a plurality of light sources of a plurality of transmission beams;

a processor configured to individually control light emission and light extinction of the plurality of light sources of the plurality of transmission beams, wherein each of the plurality of light sources is controlled at a respective frequency of a plurality of frequencies, the light emission and the light extinction of each of the plurality of light sources is in a unique pattern of each of the plurality of light sources of the plurality of transmission beams;

a modulation cycle is divided into a plurality of time sections, and the unique pattern is in units of the plurality of time sections;

an optical deflector configured to:

deflect the plurality of transmission beams, wherein the plurality of transmission beams are deflected at different respective frequencies of the plurality of frequencies, the plurality of transmission beams are deflected at angles based on the plurality of frequencies; and simultaneously project the plurality of transmission beams to a plurality of visual fields;

a detection unit configured to detect an interference beam, wherein the interference beam is based on interference of a local oscillation beam with a reception beam, and the reception beam is a reflection of the plurality of transmission beams by a measurement target; and a modulation unit configured to modulate the plurality of frequencies of the plurality of transmission beams based on the modulation cycle.

2. The distance measuring device according to claim 1, wherein the plurality of transmission beams at the different respective frequencies is multiplexed into a multiplexed transmission beam, and the optical deflector is further configured to deflect each of the plurality of transmission beams multiplexed in the multiplexed transmission beam at an angle based on the respective frequency of the plurality of frequencies.

3. The distance measuring device according to claim 2, wherein the local oscillation beam is a part of the multiplexed transmission beam.

4. The distance measuring device according to claim 1, further comprising:

a light emission control table in which a code is registered, wherein the unique pattern for each of the plurality of light sources of the plurality of transmission beams is coded in the registered code, and the unique pattern for each of the light sources of the plurality of transmission beams is based on the code registered in the light emission control table.

5. The distance measuring device according to claim 1, wherein the light emission is in a number of time sections of the plurality of time sections in the modulation cycle, and a number of light sources of the plurality of transmission beams is based on the number of time sections of the plurality of time sections in the modulation cycle.

6. The distance measuring device according to claim 1, wherein the light emission is in a first number of time sections of the plurality of time sections in the modulation cycle, a number of light sources of the plurality of transmission beams is set based on a second number of time sections in the first number of time sections in the modulation cycle, and the second number of time sections indicate time sections for chirp modulation associated with the light emission.

7. The distance measuring device according to claim 1, wherein the modulation unit is further configured to modulate the plurality of frequencies of the plurality of transmission beams with same respective modulation bandwidths.

8. The distance measuring device according to claim 1, wherein the modulation unit is further configured to modulate the plurality of frequencies of the plurality of transmission beams with different respective modulation bandwidths.

9. The distance measuring device according to claim 8, wherein a distance and a relative speed of the measurement target are based on a plurality of frequency spectra, each of the plurality of frequency spectra corresponds to the respective light source of the plurality of light sources of the plurality of transmission beams, a first reception signal sequence corresponds to a time section in which the plurality of light sources of the plurality of transmission beams emits light, a second reception signal sequence is obtained by photoelectric conversion of an output of the detection unit, the plurality of frequency spectra is obtained by extraction of the first reception signal sequence from the second reception signal sequence, perform discrete Fourier transform on the first reception signal sequence, and the modulation unit is further configured to modulate the plurality of frequencies of the plurality of transmission beams with the different respective modulation bandwidths to be equal to or higher than a frequency resolution in the discrete Fourier transform.

10. The distance measuring device according to claim 1, wherein a distance and a relative speed of the measurement target are based on a plurality of frequency spectra respectively corresponding to the plurality of light sources of the plurality of transmission beams, and the plurality of frequency spectra is based on an output of the detection unit.

11. The distance measuring device according to claim 1, wherein a distance and a relative speed of the measurement target are specified based on a beat frequency specified from a plurality of frequency spectra respectively corresponding to the plurality of light sources of the plurality of transmission beams, and the plurality of frequency spectra is based on an obtained from the output of the detection unit.

12. The distance measuring device according to claim 11, wherein the beat frequency is based on a comparison of magnitudes of peaks of the plurality of frequency spectra respectively corresponding to the plurality of light sources of the plurality of transmission beams.

13. The distance measuring device according to claim 10, wherein each of the plurality of frequency spectra corresponds to the respective light source of the plurality of light sources of the plurality of transmission beams, a first reception signal sequence corresponds to a time section in which the plurality of light sources of the plurality of transmission beams emits light, a second reception signal sequence is obtained by photoelectric conversion of the output of the detection unit, the plurality of frequency spectra is obtained by extraction of the first reception signal sequence from the second reception signal sequence, and perform discrete Fourier transform on the first reception signal sequence.

14. The distance measuring device according to claim 1, wherein the optical deflector is an optical phased array (OPA).

15. The distance measuring device according to claim 1, wherein the optical deflector includes a prism and a rotary mirror.

16. The distance measuring device according to claim 1, wherein the distance measuring device is one of coherent light detection and ranging or laser imaging detection and ranging.

17. A distance measuring method, comprising:

in a distance measuring device:

individually controlling, by a processor, light emission and light extinction of a plurality of light sources a plurality of transmission beams, wherein each of the plurality of light sources is controlled at a respective frequency of a plurality of frequencies, the light emission and the light extinction of each of the plurality of light sources is in a unique pattern of each of the plurality of light sources of the plurality of transmission beams, a modulation cycle is divided into a plurality of time sections, and the unique pattern is in units of the plurality of time sections;

deflecting, by an optical deflector, the plurality of transmission beams, wherein the plurality of transmission beams are deflected at different respective frequencies of the plurality of frequencies, the plurality of transmission beams are deflected at angles based on the plurality of frequencies; and simultaneously projecting, by the optical deflector, the plurality of transmission beams to a plurality of visual fields;

detecting, by a detection unit, an interference beam, wherein the interference beam is based on interference of a local oscillation beam with a reception beam, and the reception beam is a reflection of the plurality of transmission beams by a measurement target; and modulating, by a modulation unit, the plurality of frequencies of the plurality of transmission beams based on the modulation cycle.

18. A non-transitory computer-readable medium having stored thereon, computer-executable instructions which, when executed by a computer, cause the computer to execute operations, the operations comprising:

individually controlling light emission and light extinction of a plurality of light sources of a plurality of transmission beams, wherein each of the plurality of light sources is controlled at a respective frequency of a plurality of frequencies, the light emission and the light extinction of each of the plurality of light sources is in a unique pattern of each of the plurality of light sources of the plurality of transmission beams, a modulation cycle is divided into a plurality of time sections, and the unique pattern is in units of the plurality of time sections;

deflecting the plurality of transmission beams, wherein the plurality of transmission beams are deflected at different respective frequencies of the plurality of frequencies, the plurality of transmission beams are deflected at angles based on the plurality of frequencies; and simultaneously projecting the plurality of transmission beams to a plurality of visual fields;

detecting an interference beam, wherein the interference beam is based on interference of a local oscillation beam with a reception beam, and the reception beam is a reflection of the plurality of transmission beams, by a measurement target; and modulating the plurality of frequencies of the plurality of transmission beams based on the modulation cycle.

\* \* \* \* \*